United States Patent [19]

Tong

[11] Patent Number: 5,729,015

[45] Date of Patent: Mar. 17, 1998

[54] POSITION CONTROL SYSTEM FOR SCANNING PROBE MICROSCOPE

[75] Inventor: Yi Tong, Hachioji, Japan

[73] Assignee: Olympus Optical Co., Ltd., Tokyo, Japan

[21] Appl. No.: 591,092

[22] Filed: Jan. 25, 1996

[30] Foreign Application Priority Data

Jan. 30, 1995 [JP] Japan .................................. 7-012472
Mar. 27, 1995 [JP] Japan .................................. 7-067916

[51] Int. Cl.⁶ .................................................. H01J 37/00
[52] U.S. Cl. ........................................... 250/306; 73/105
[58] Field of Search ................................ 250/306, 307; 73/105

[56] References Cited

U.S. PATENT DOCUMENTS

| | | | |
|---|---|---|---|
| 4,843,293 | 6/1989 | Futami | 318/609 |
| 5,336,887 | 8/1994 | Yagi et al. | 250/306 |
| 5,376,790 | 12/1994 | Linker et al. | 250/306 |
| 5,381,101 | 1/1995 | Bloom et al. | 250/306 |
| 5,469,734 | 11/1995 | Schuman | 73/105 |
| 5,481,908 | 1/1996 | Gamble | 250/306 |
| 5,496,999 | 3/1996 | Linker et al. | 250/306 |
| 5,521,390 | 5/1996 | Sato et al. | 250/306 |
| 5,543,614 | 8/1996 | Miyamoto et al. | 250/306 |

FOREIGN PATENT DOCUMENTS 63-189911 8/1988 Japan .
6-229753 8/1994 Japan .

*Primary Examiner*—Bruce Anderson
*Attorney, Agent, or Firm*—Frishauf, Holtz, Goodman, Langer & Chick

[57] ABSTRACT

A position control system for a scanning probe microscope which performs calculations so that the natural resonant frequency of a piezoelectric element may be as flat as possible, and then controls the scanning voltage of the piezoelectric element. The scanning signal from outside a position control circuit is inputted to an integral compensator via a comparator. The output of the integral compensator is supplied from an adder to the piezoelectric element via a high-voltage amplifier and also to a reference model section. The output of the piezoelectric element, together with the output of the reference model section, is supplied to a comparator and at the same time, is fed back to the comparator via a displacement sensor. Furthermore, the comparator inputs a correcting voltage Va to an adder via an adaptive mechanism section. The scanning voltage added at the adder is amplified at the high-voltage amplifier, which supplies the amplified voltage to the piezoelectric element as a control voltage Vp.

17 Claims, 15 Drawing Sheets

POSITION CONTROL SYSTEM FOR SCANNING PROBE MICROSCOPE

BACKGROUND OF THE INVENTION

1. Field of the Invention

This invention relates to a position control system for a scanning probe microscope, and more particularly to a position control system for a scanning probe microscope using a reference model of a piezoelectric element that presents a flat characteristic at the natural resonant frequency $\omega_p$ of the piezoelectric element.

2. Description of the Related Art

Three-dimensional scanning mechanisms using piezoelectric elements have been widely used to move a minute movement stage with a resolution on the order of nanometers. For scanning probe microscopes (SPM) requiring atomic resolution, such as a scanning tunneling microscope (STM) that forms an image by tracing the surface of the specimen in atomic-level dimensions by means of tunnel current or such as an atomic force microscope (AFM), the scanning mechanisms have been popularized widely as a mechanism for driving a stage that determines the x, y, and z directions of the specimen or the probe.

In general, the scanning probe microscopes are three-dimensional measuring instruments that cause the probe to approach the specimen, sense a physical quantity acting between them, cause the probe to trace (scan) the unevenness of the specimen's surface on the basis of the physical quantity, determine the differences in properties of the specimen's surface on the order of atomic size.

The aforementioned AFM is considered to be one of such scanning probe microscopes. In the AFM, while the movement of the cantilever being displaced by the interactive force acting between the atoms at the tip of the probe and the specimen is electrically or optically being sensed and determined, the specimen or the probe is scanned in the X and Y directions and the positional relationship between the probe section of the cantilever with the specimen's surface is changed relatively, thereby obtaining information about the unevenness of the specimen on the order of atomic size three-dimensionally.

Although the AFM has been used as an apparatus for viewing the surface of a specimen with an ultrahigh resolution, it has recently come into use as an instrument for measuring the line width, the step height, etc. in a semiconductor or a liquid crystal.

With scanning probe microscopes, to prevent the degradation of the picture quality due to the resonant characteristic of the piezoelectric element, the development of high-speed, high-accuracy position control techniques has been demanded. Therefore, a technique for increasing the accuracy of the position control system for servo and scanning on the order of micron or nanometer has been in great demand.

FIG. 1 shows an example of the configuration of a conventional scanning probe microscope.

In FIG. 1, a cylindrical piezoelectric element 2 outputs xp and yp of the actual displacement to an XY position control circuit 6. An X, Y position command section 4 outputs scanning signals x, y to the XY position control circuit 6. The XY position control circuit 6 then outputs an X control signal (a driving voltage for the piezoelectric element in the X direction) Vx* and a Y control signal (a driving voltage for the piezoelectric element in the Y direction) Vy* to the piezoelectric element 2.

Although the control signals Vx* *, Vy are signals that drive the piezoelectric element 2 on the basis of the scanning signals x, y, they are used as signals for correcting the displacements when the actual displacements xp, yp of the piezoelectric element 2 do not coincide with the scanning signals x, y. Namely, they are used as feedback control signals.

The scanning signal x, y and the actual displacements xp, yp are inputted to the XY position control circuit 6, which compares them. The correction signal obtained on the basis of the comparison is applied in voltage form from the XY position control circuit 6 to the piezoelectric element, thereby causing the actual displacements xp, yp of the piezoelectric element 2 to coincide with the scanning signals x*, y*.

Inside the piezoelectric element 2, a mirror 10 for measuring displacements in the X and Y directions is provided at the top of the piezoelectric element 2. Almost in the central portion, a lens 12 for gathering rays of laser light is provided. The bottom end of the piezoelectric element 2 is secured to a unit containing an X displacement sensor 14 and a Y displacement sensor 16. The X displacement sensor 14 and Y displacement sensor 16 are sensors for sensing the two-dimensional movement of the piezoelectric element 2 and output the actual displacement xp, yp to the XY position control circuit 6. They have been described in detail in the scanning system disclosed in, for example, Jpn. Pat. Appln. KOKAI Publication No. 6-229753, so that their explanation will not be given here.

On the top of the piezoelectric element 2, the specimen carrier 18 for holding a specimen 20 is positioned. A probe displacement sensing section 24 has a cantilever 22 at its tip portion and senses the displacement of the cantilever 22 optically and electrically. The probe displacement sensing section 24 outputs a displacement signal Sz to the Z displacement servo control section 8.

The Z displacement control section 8 performs feedback control so that the displacement of the cantilever 22 may remain constant, and outputs a Z control signal (a driving voltage for the piezoelectric element in the Z direction) Vz* that expands and contracts the piezoelectric element 2 in the Z direction, that is, information on the unevenness of the displacement, to an SPM image display unit 26. The SPM image display unit 26 stores the measurement data based on the transferred Vz* and forms an image. In FIG 1, X indicates the X direction, Y the Y direction, and Z the Z direction.

FIG. 2 is a block diagram of the Z displacement servo control section 8 of the scanning probe microscope of FIG. 1 and its peripheral section.

In FIG. 2, the difference between the reference signal Z* and the actual displacement signal Sz of the piezoelectric element 34 sensed at the displacement sensor 40 is obtained at the comparator 38. Thereafter, the difference is integrated at the integral compensator 30, which produces a voltage Vz to be applied to the piezoelectric element 34.

FIG. 3 is a block diagram of the configuration of the X scanning feedback control system of the conventional piezoelectric element 2 shown in FIG. 1. Only the X scanning feedback system is shown in FIG. 3. The same is true for the Y scanning feedback control system.

In FIG. 3, a scanning signal x* and the actual displacement $x_p$ are inputted to a comparator 28, the output of which is supplied to an integral compensator 30. The output of the integral compensator 30 is supplied to a piezoelectric element 34 via a high-voltage amplifier 32. The output of the piezoelectric element 34 is the actual displacement, which is supplied to the comparator 28 via a displacement sensor 36.

Here, in the Z displacement servo control system of FIG. 2, it is assumed that the gain Kh of the high-voltage amplifier 32 of FIG. 3 is Kh=1. Namely, the gain Kh is omitted.

Hereinafter, the integral gain of the integral compensator 30 is indicated by $K_{ci}$ in both the XY directions and the Z direction. The integral gain $K_{ci}$ is one of the parameters that determine the response speed of the piezoelectric element 34. For example, as the integral gain $K_{ci}$ is increased, the response speed of the piezoelectric element 34 gets faster accordingly.

In the X scanning feedback control system of FIG. 3, the function written at the piezoelectric element 34 is the transfer function of the piezoelectric element 34.

Ks in FIG. 3 indicates the gain of the displacement sensor 36.

As seen from an example of the frequency characteristic actually measured in the X direction of the cylindrical piezoelectric element shown in FIG. 4, however, the vibration of the piezoelectric element peaked at 1900 Hz. In this case, the damping coefficient $\xi_p$ (=0.0169) is much less than 0.7, the ideal value with no vibration, from which it is found that the cylindrical piezoelectric element is a mechanical vibration system with a poor damping characteristic.

FIG. 5A is a Bode diagram of the Z-axis displacement of a conventional piezoelectric element, the integrator gain, and the applied voltage frequency characteristic. As shown in FIG. 5A, a peak appears at a resonant frequency of about 6400 Hz (indicated by f0) in the piezoelectric element 34, wherein fi is used to evaluate the control band of the control system.

Therefore, it is understood that the resonant frequency differs with the movement direction and the characteristic of the piezoelectric element 34, but the frequency characteristic is almost the same in the examples shown in both FIG. 4, FIGS. 5A and 5B.

It is known, however, that when the peak value of the gain characteristic of the resultant closed loop at the resonance point has exceeded 0 dB, the control system becomes unstable. This is a problem common to both the piezoelectric element 34 of FIG. 4 and that of FIGS. 5A and 5B.

Here, "unstable" means that as the response speed of the piezoelectric element is increased, the position control system is more liable to permit the piezoelectric element to vibrate. Therefore, the control system has performed control by causing the integral compensator to adjust the integral gain $K_{ci}$ so that the peak value of the resultant closed loop gain characteristic at the resonance point may not exceed 0 dB.

The control will be explained in detail below.

First, the Z displacement servo control system will be explained.

As shown in FIG. 5B, to minimize the influence in the vicinity of the first-order resonant frequency of the Z-axis piezoelectric element, the gain characteristic of the integrator is dropped at a frequency much lower than the resonance point of the piezoelectric element 34. Namely, the integral gain $K_{ci}$ is set small. This makes it possible to suppress the peak of the resultant closed loop gain characteristic at the resonance point to 0 dB or less.

In other words, in the conventional Z displacement servo control system of FIG. 2, as the integral gain $K_{ci}$ increases, the resultant closed loop gain characteristic shifts to the right as shown in FIG. 5B, raising the resonance peak of the piezoelectric element 34, with the result that the control system becomes unstable. Therefore, in practical use, the integral gain $K_{ci}$ must be very small.

Hereinafter, using FIGS. 6 and FIGS. 7, a case will be explained where the Z displacement servo control system is unstable when the integral gain $K_{ci}$ of the integral compensator 30 is increased, or when the scanning speed is increased.

FIG. 6A shows the step response characteristic for an integral gain $K_{ci}$=250 in the prior art. With the integral gain, it took about 25 msec for the rising of the curve to be stable. When the integral gain $K_{ci}$ has exceeded 500, the step response gets faster (about 15 msec) as shown in FIG. 6B, but the control system becomes unstable and eventually oscillates and cannot be controlled.

FIGS. 7A to 7C are response characteristic diagrams for the Z-direction displacement servo control system of a conventional scanning probe microscope using the aforementioned piezoelectric element. The cross section of the specimen is rectangular. The unevenness of the specimen's surface has a level difference of about 500 nm. In FIGS. 7A to 7C, the actual shapes are shown by broken lines and the follow-up characteristic is shown by solid lines.

FIG. 7A is a characteristic diagram to help explain the case where the piezoelectric element is following the level differences of the unevenness of the specimen's surface in the Z direction in scanning the specimen in the X direction at a constant scanning speed. It can be seen from the FIG. 7A that the follow-up characteristic is poor and the rising does not follow the step and makes a gentle curve. To make the response faster, the gain of the integrator must be set greater. As shown in FIG. 7B, however, it can be seen that as the gain of the integrator becomes larger, the response gets faster, but is oscillating. Furthermore, when the X-direction scanning speed is doubled, the piezoelectric element fails to follow the unevenness of the specimen's surface as shown in FIG. 7C.

As described above, because the Z-direction servo produces a poor response to the unevenness cross section of the specimen shown in FIGS. 7A to 7C, the positioning accuracy cannot be raised. Thus, in the case of a specimen having large and sharp bumps, measurement errors occur in the Z direction, so that high-speed two-dimensional scanning cannot be effected and consequently high-speed measurement cannot be carried out. In the case of a specimen with a large level difference in the unevenness, the probe hits the specimen's surface during scanning because the response of the servo is slow, resulting in the danger of causing damage to the probe or the surface of the specimen.

The replacement of the specimen carrier or the specimen causes the resonating point of the piezoelectric element to shift toward lower frequencies as a result of an increase in the weight of the specimen carrier or the specimen, so that the control gain must be lowered further. This causes the problem that the parameters of the control system have to be adjusted each time the specimen carrier or the specimen is replaced.

Explained next will be the X scanning feedback system shown in FIGS. 3 and 4.

In the scanning control system in the conventional scanning probe microscope having the XY displacement sensors, the response signal of FIG. 9B follows the scanning signal at a scanning speed of 1 Hz shown in FIG. 9A. As the scanning speed becomes as fast as 10 Hz, however, the piezoelectric element fails to follow the scanning signal at the turning point of time in scanning as shown in FIGS. 8A and 8B. In addition, since follow-up errors are proportional to the turning speed, the faster the scanning speed, the greater the follow-up errors.

As described above, the maximum scanning speed of the SPM is also limited by the XY direction vibration characteristic of the piezoelectric element.

To suppress the vibrating characteristic of the piezoelectric element, for example, Jpn. Pat. Appln. KOKAI Publication No. 63-189911 has disclosed control means in which an acceleration sensor is used to supply the sense signal to an acceleration first-order delay circuit and the delayed signal is added to the applying voltage instruction. The system, however, requires an acceleration sensor and a processing circuit, so that the inevitable result is that the system gets complicated and larger.

Furthermore, as described earlier, with the scanning probe microscope, to prevent the deterioration of the picture quality, the development of high-accuracy, high-speed position control techniques has been demanded. As the XY scanning speed gets faster, the response in the Z direction must be made much faster.

The basic idea of realizing high-speed scanning and response in the scanning probe microscope comes from making the resonant frequency of the Z-axis minute movement mechanism piezoelectric element as high as possible and the amplitude during resonance as small as possible. Namely, the stiffness of the piezoelectric element is made as high as possible. The improvement of the position control accuracy of the piezoelectric element is considered to be achieved by the higher stiffness of the piezoelectric element and the higher gain of the control system.

Since all of the materials of the mechanism have a finite mass and a finite stiffness, however, the increase of the natural frequency has a limitation.

SUMMARY OF THE INVENTION

The object of the present invention is to provide a position control system for a scanning probe microscope which not only makes the control system stabilize and respond faster, but also prevents the probe from hitting a specimen's surface during scanning and causing damage to the probe or the specimen's surface, which eliminates the need to adjust the parameters of the control system each time the specimen carrier or the specimen is replaced, and which does not make the system more complicated or larger.

It is an object of the present invention to provide a scanning probe microscope comprising: a cantilever having a fixed end portion and a free end portion; a probe provided at the free end portion of the cantilever; moving means for holding either the probe or a specimen and moving the relative positions of them; control signal output means for outputting a control signal for performing position control of the moving means; actual movement sensing means for sensing the actual movement of the moving means on the basis of the control signal output means; theoretical value output means for outputting the theoretical movement of the moving means on the basis of the control signal output means; correcting signal output means for outputting a correcting signal for canceling the deviation of the actual movement from the theoretical movement; and correction control signal generating means for generating, on the basis of the control signal and the correcting signal, a correction control signal to be supplied to the moving means.

It is another object of the present invention to provide a scanning probe microscope comprising: a cantilever having a fixed end portion and a free end portion; a probe provided at the free end portion of the cantilever; moving means for holding either the probe or a specimen and moving the relative positions of them; control signal output means for outputting a control signal for performing position control of the moving means; probe displacement sensing means for sensing the probe displacement; theoretical value output means for outputting the theoretical movement of Z position of the moving means on the basis of the control signal output means; correcting signal output means for outputting a correcting signal for canceling the deviation of the probe displacement from the theoretical movement; and correction control signal generating means for generating, on the basis of the control signal and the correcting signal, a correction control signal to be supplied to the moving means.

With the invention, in the XY scanning control system of a scanning probe microscope using a piezoelectric actuator, a reference model section (theoretical value output means) with a transfer function Ga(s) like a convectional scanning control system having a flat frequency characteristic at the natural resonant frequency $\omega_p$ of the piezoelectric element, is caused to move the vibrating pole point of the transfer function Gp(s) of the piezoelectric actuator to suppress the resonance peak of the piezoelectric actuator according to the flat characteristic, thereby making the control system respond faster and stabilize better. This makes it possible to stabilize the mechanical vibration system with a poor damping characteristic. Furthermore, this makes it possible to set the gain of the position control loop higher, which not only makes the response of the position control system faster, but also raises the accuracy. In this way, the problem that the scanning speed cannot be raised in the position control system using an integral compensator can be solved, enabling the piezoelectric element to move in the XY two-dimensional directions at high speeds.

Furthermore, with the scanning probe microscope of the present invention, the displacement Sz of the probe of the cantilever is sensed from the displacement sensing section or tunnel current sensing section of the cantilever. The displacement Sz is compared with a previously set reference value. The deviation ΔZ is integrated at the integrator, which produces an applying voltage Vz*. The applying voltage Vz* is passed through a specific low-pass filter, which produces the output Zm of the reference model of the piezoelectric element. The deviation ΔS obtained from the output Zm of the reference model of the piezoelectric element and the displacement Zk in the Z direction of the piezoelectric element supplied from the piezoelectric element Z-direction displacement sensing section is input to the proportion differential control section. The proportion differential control section calculates ΔV. On the basis of the calculation result, the applying voltage Vz to the piezoelectric element is controlled in such a manner that the following equations (1) and (2) are fulfilled so that the actual displacement of the piezoelectric element may follow the output of the reference model:

$$Vz = Vz^* - \Delta V \quad (1)$$

$$\Delta V = K_{ap}\Delta S + K_{ad}\frac{d(\Delta S)}{dt} \quad (2)$$

where $K_{ap}$ and $K_{ad}$ indicate the proportional differential gains.

As described above, with the scanning probe microscope of the present invention, by sensing the displacement of the piezoelectric element, comparing the sensed displacement with the output of the reference model that does not resonate, and positively controlling the deviation, the voltage applied to the piezoelectric element is adjusted so as to suppress the mechanical resonance peak of the piezoelectric element. As a result, the control band is expanded and the gain of the control loop can be set high, which makes it possible to speed up the response of the Z-direction displacement servo control system.

Furthermore, the Z-direction control accuracy is increased, and it is also possible to sense minute changes in the information on the specimen's surface stably at high speeds without slowing the scanning speed in the XY directions of the piezoelectric element. In the case of a specimen with great and sharp irregularities in the surface, there is no possibility that serious damage will be caused to the probe or the specimen's surface. Even when a change in the weight of the specimen carrier or the specimen causes the resonating point of the piezoelectric element to change, it is possible to sense minute changes in the information on the specimen's surface stably at high speeds.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiment given below, serve to explain the principles the invention.

DETAILED DESCRIPTION OF THE PREFERRED EMBODIMENTS

Hereinafter, referring to the accompanying drawings, embodiments of the present invention will be explained.

Figure 1:
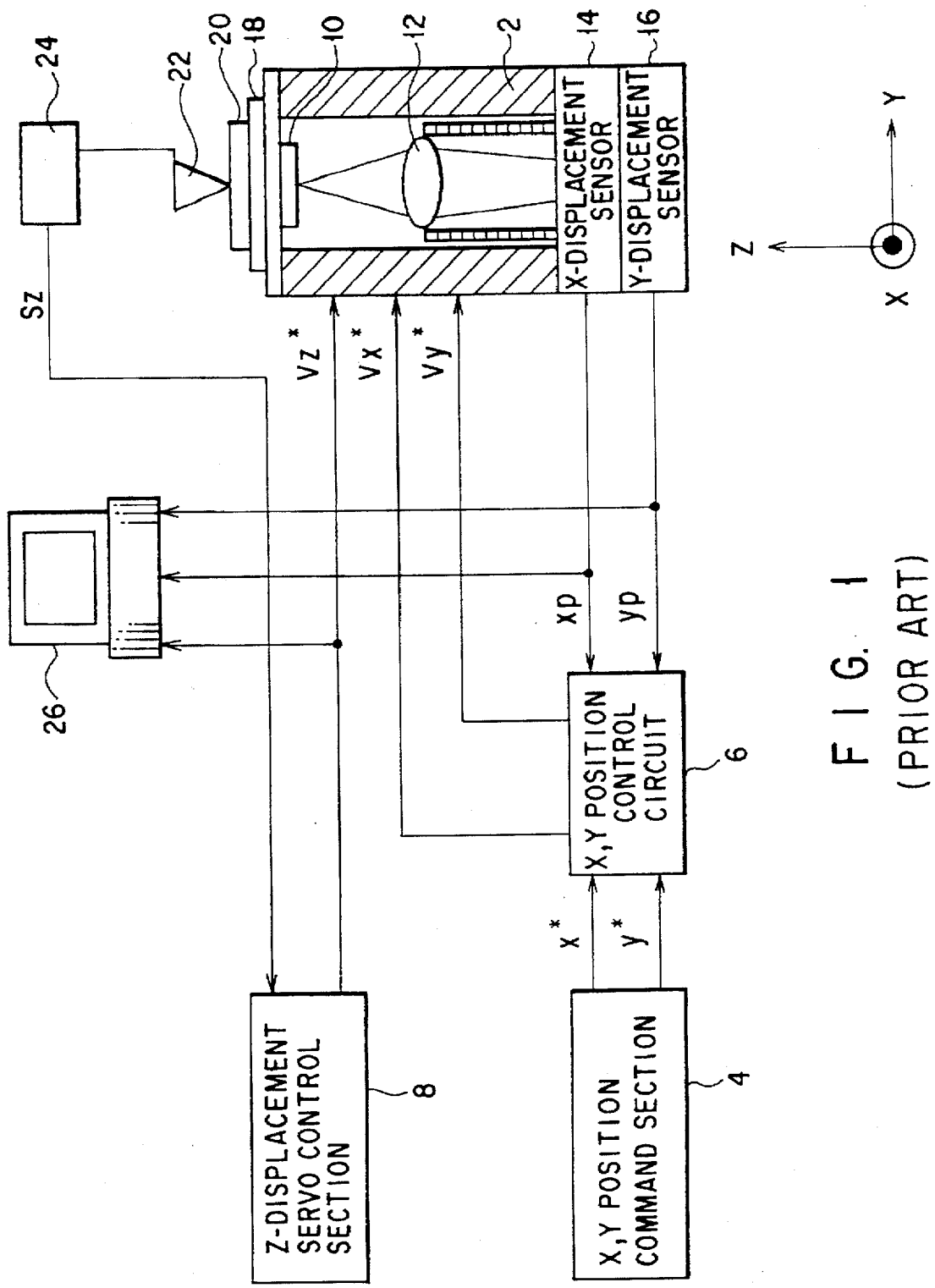
FIG. 1 shows an example of the configuration of a conventional scanning probe microscope.
Figure 10:
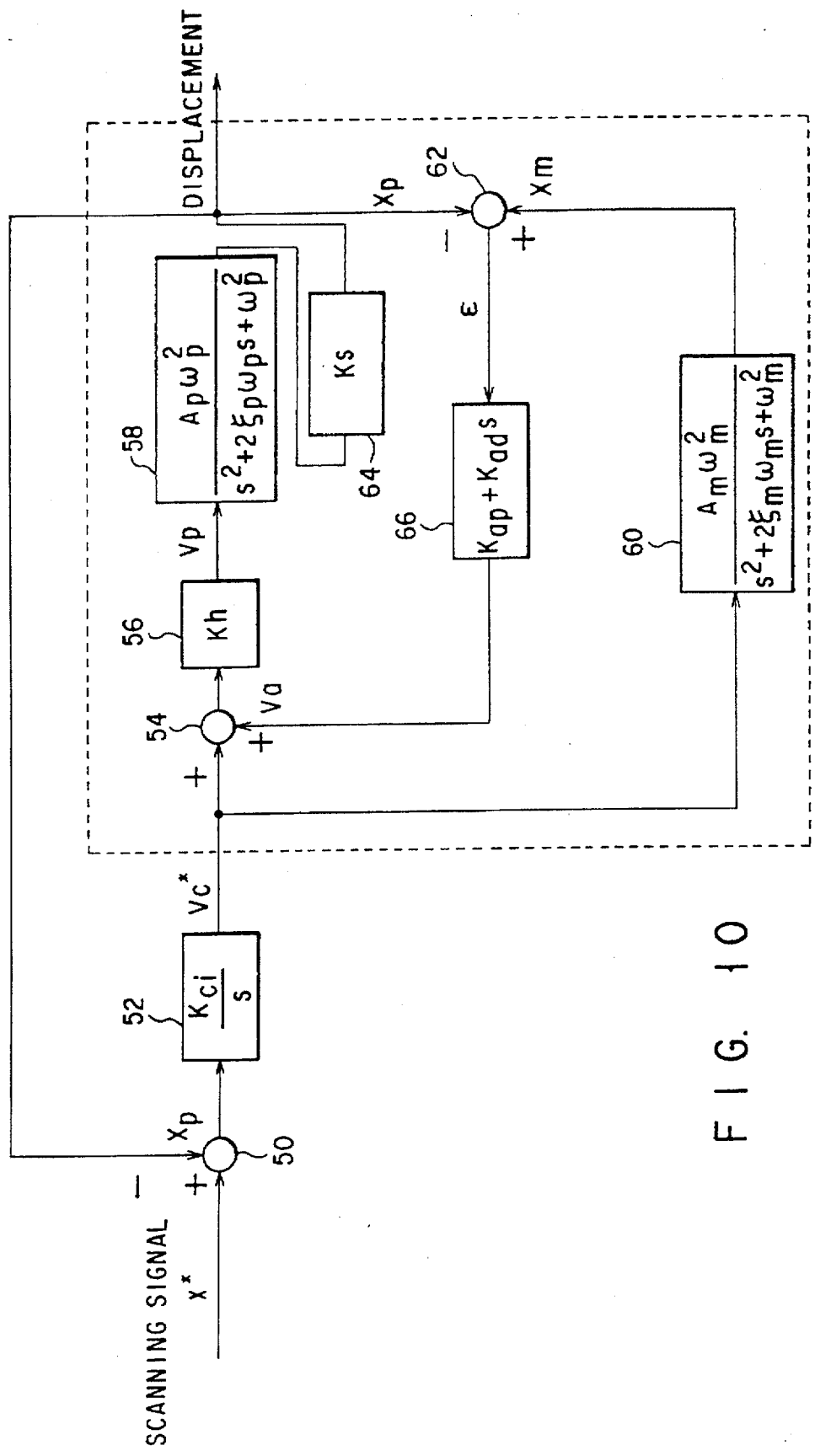
FIG. 10 is a block diagram of the position control system in a scanning probe microscope according to the present invention.

FIG. 10 is a block diagram of the position control system in a scanning probe microscope according to the present invention. The basic configuration of the scanning probe microscope is the same as that of FIG. 1, and although only the X scanning feedback control system will be described herein below, the same is true for the Y scanning feedback control system.

In FIG. 10, the position control system is includes of an adaptive mechanism section and a follow-up control section based on an adaptive model. In FIG. 10 the follow-up control section is enclosed by broken lines.

A scanning signal x* supplied from outside a position control circuit is inputted to an integral compensator 52 via a comparator 50. The output (scanning voltage Vc*) of the integral compensator 52 is supplied from an adder 54 to a piezoelectric element 58 via a high-voltage amplifier 56 and also to a reference model section 60 having a transfer function of the displacement of the piezoelectric element 58 free from the influence of disturbances such as vibration.

The displacement XP of the piezoelectric element 58 A2 is sensed by the displacement sensor 64 which has a gain of Ks. The displacement Xp sensed by the displacement sensor 64 is supplied together with the output of A3 the reference model section 60 to a comparator 62 and also fed back to the comparator 50. The comparator 62 inputs a correcting voltage Va to an adder 54 via an adaptive mechanism section 66.

The integrator 52 inputs a scanning voltage Vc* to the follow-up control section, in which the reference model section 60 calculates a displacement Xm as a reference model, that is, a displacement free from vibration or disturbance.

The adaptive mechanism section 66 suitably amplifies the deviation of position Xm of the reference model section 60 from the actual displacement $x_p$ of the piezoelectric element 58 and calculates a correcting voltage Va. The correcting voltage Va is added to the scanning voltage Vc*.

Then, the adaptive mechanism section 66 generates a control input (correcting voltage) Va so that the displacement $x_p$ of the piezoelectric element 58 may follow the output Xm of the reference model section 60. If the transfer function Gp(s) of the piezoelectric element 58 coincides with the transfer function Gm(s) of the reference model section 60 completely, it will follow that Va=0, meaning that the control system is equivalent to the conventional control system as shown in FIG. 3.

Specifically, the scanning signal x is compared with the displacement $x_p$ of the piezoelectric element 58 sensed by the displacement sensor 64'. An error in the comparison result is computed at the integral compensator 52, which generates a scanning voltage Vc* applied to the piezoelectric element 58. The scanning voltage Vc* is inputted to the reference model section 60. The output Xm from the reference model section 60 is compared with the actual displacement $x_p$ of the piezoelectric element 58 at the comparator 62. The error ε in the comparison result from the comparator 62 is corrected by a PD compensator (proportional differential compensator), the adaptive mechanism section 66, which generates a correcting voltage Va. In this way, the correcting voltage Va is added to the scanning voltage at the adder 54. Thereafter, the scanning voltage is amplified by the high-voltage amplifier 56 and supplied as a control voltage Vp to the piezoelectric element 58.

Here, the difference between position control using a conventional usual integral compensator and position control according to the present invention will be described.

Figure 3:
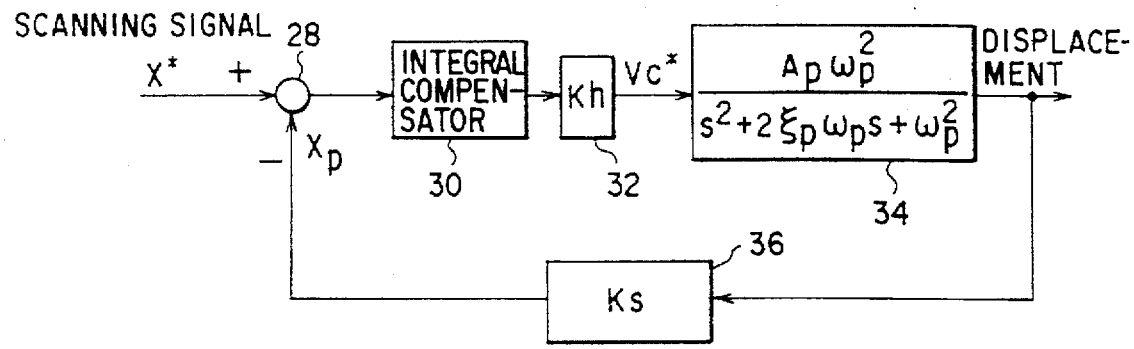
FIG. 3 is a block diagram of the XY scanning feedback control system in the conventional piezoelectric actuator of FIG. 1.

In the case of position control using a conventional usual integral compensator as shown in FIG. 3, $$Gc(s) \cdot Gp(s) = \frac{K_{ci}K_hK_sA_p\omega_p^2}{s(s^2 + 2\xi_p\omega_p s + \omega_p^2)} \quad (3)$$

where Kh is the gain of the high-voltage amplifier 56, and Ks is the gain of the displacement sensor 64.

The gain Kh of the high-voltage amplifier 56 may be Kh=11, which has no serious effect on the invention.

Figure 2:
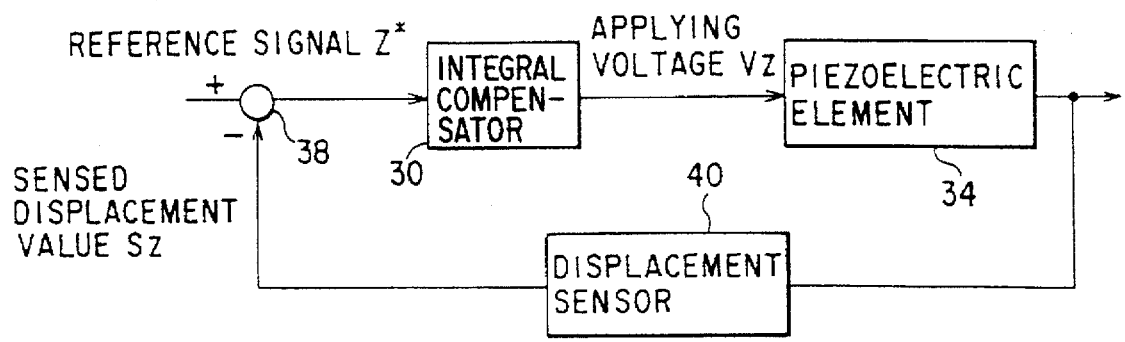
FIG. 2 is a block diagram of the Z-displacement servo control section in the scanning probe microscope of FIG. 1 and its peripheral circuitry.
Figure 4:
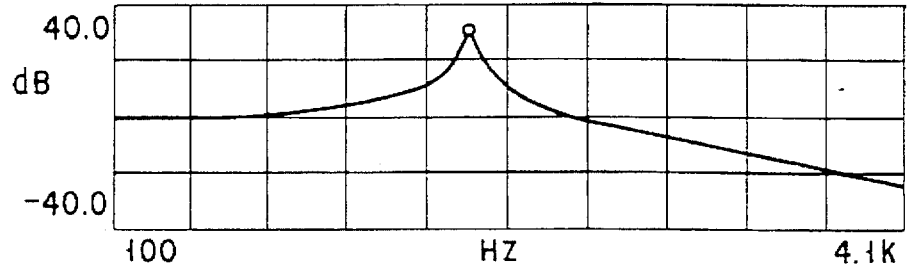
FIG. 4 is a frequency characteristic diagram in the X direction of a cylindrical piezoelectric element.
Figure 5A:
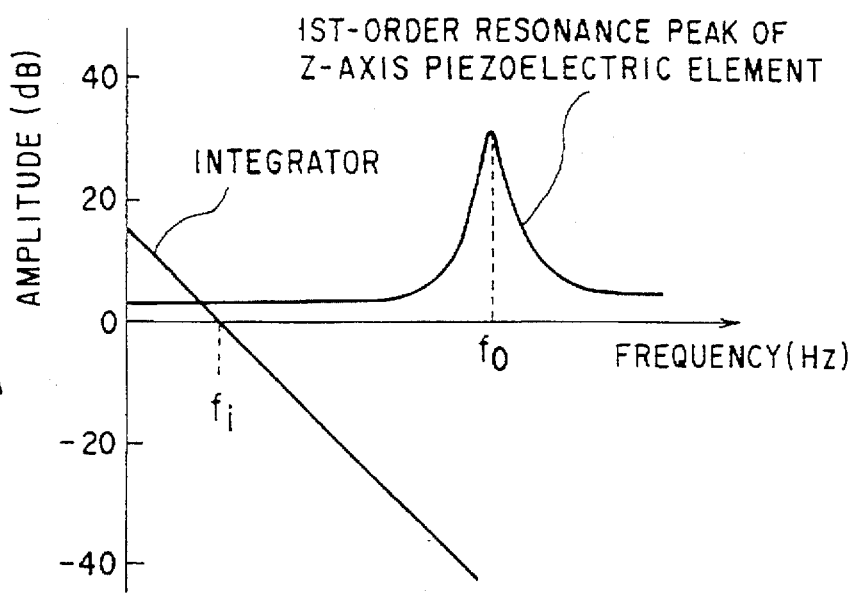
FIG. 5A is a Bode diagram showing the Z-axis displacement of a conventional piezoelectric element, the gain of an integrator, with the applying voltage frequency characteristic.
Figure 5B:
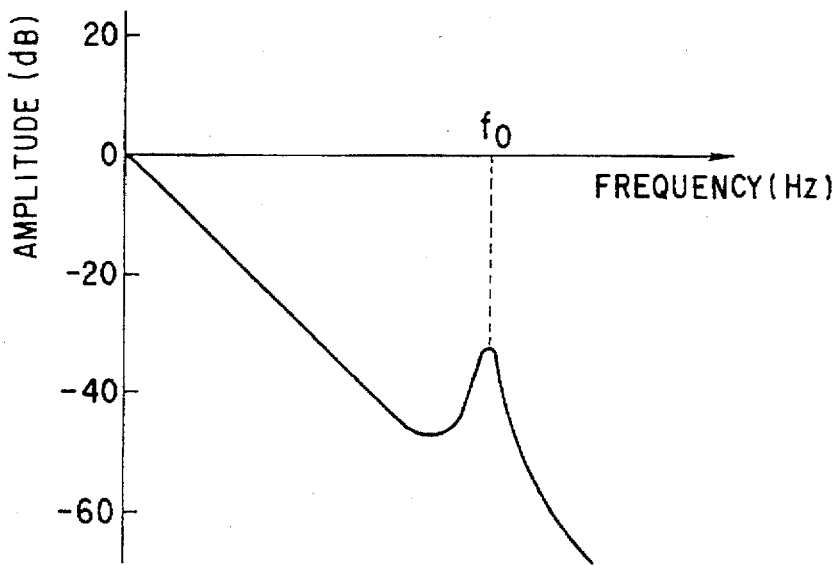
FIG. 5B is a Bode diagram showing the frequency characteristic of the closed loop into which the individual components in FIG. 5A are combined.
Figure 11:
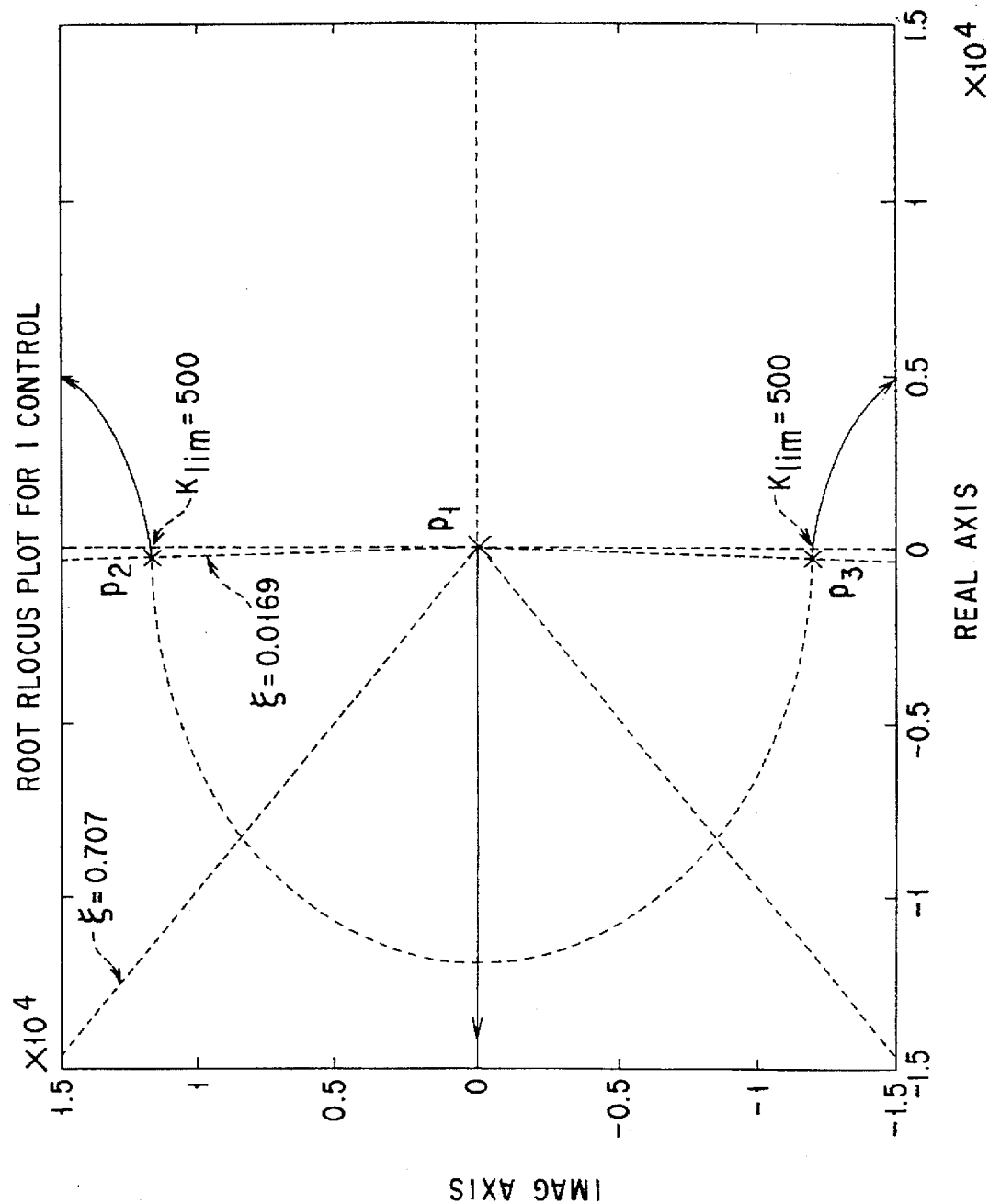
FIG. 11 is a diagram of a root locus showing the change of the pole of the closed loop for an integral gain of $K_{ci}$ in a general control system.

FIG. 11 shows a root locus indicating the change of the pole of the closed loop for an integral gain of $K_{ci}$ of the control system for the piezoelectric element having the frequency characteristic of FIG. 4. The scanning feedback control system of FIG. 2 is used as the closed loop. In FIG. 11, the symbol x represents a pole. Because the damping coefficient of the piezoelectric element (piezoelectric actuator) 58 is $\xi_p<1$, a set of conjugate roots are:

$$p_2 = \omega_p(-\xi_p + j\sqrt{\xi_p^2 - 1}) \quad (4)$$

$$p_3 = \omega_p(-\xi_p - j\sqrt{\xi_p^2 - 1})$$

Figure 6A:
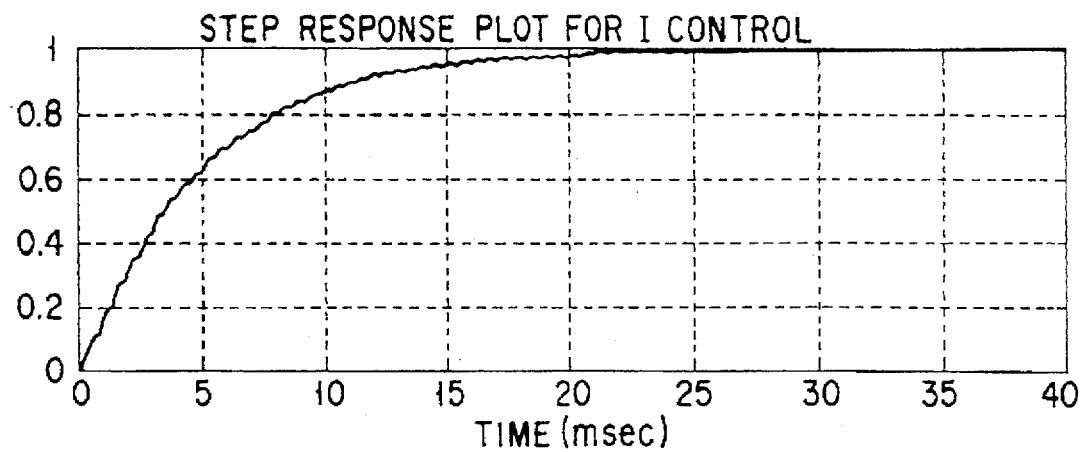
FIG. 6A is a step response characteristic diagram in the prior art for an integral gain of $K_{ci}$=250 and FIG. 6B is a step response characteristic diagram for an integral gain of $K_{ci}$=500 or more.
Figure 6B:
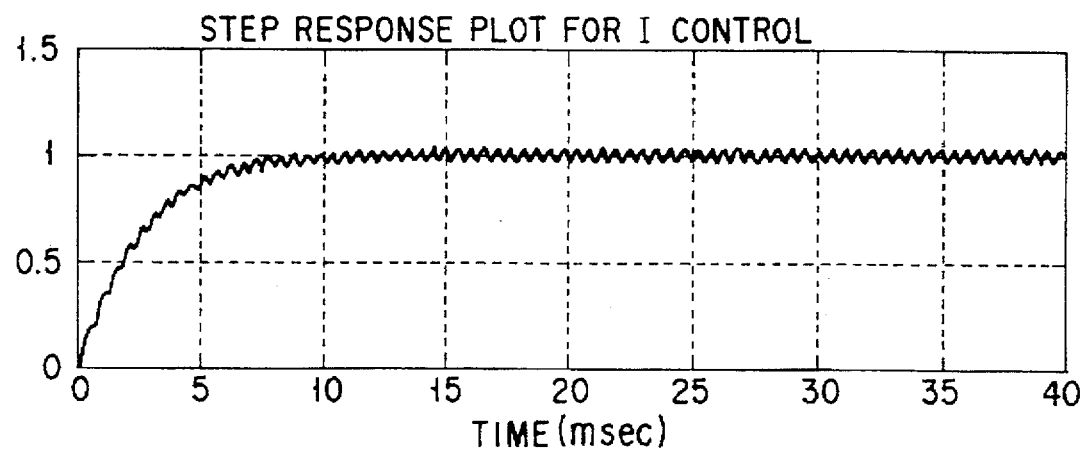

As shown in FIG. 11, as the gain $K_{ci}$ increases, the root locus starting from vibrating poles $P_2$ $P_3$ goes from the half plane on the left side of the imaginary axis into that on the right side of the imaginary axis as shown in the figure. Since control on the half plane on the left side of the imaginary axis is known to be stable control, if the control system performs control on the half plane on the right side of the imaginary axis, the system will be unstable as shown in the step response characteristic of FIG. 6B. Thus, in practical use, $K_{ci}$ must be less than the limit gain $K_{lim}$=500 in the case of FIG. 11.

With the position control system in a general scanning probe microscope, the gain of the closed loop cannot be made greater in the case of the vibration system with a poor damping characteristic as described earlier, so that the response of the closed loop gets worse. Consequently, as the scanning speed gets faster, the piezoelectric element cannot follow the scanning signal at its turning point. As the weight of the specimen carrier and specimen increases, the resonating point of the piezoelectric element shifts toward low frequencies, so that the control gain has to be lowered further. This makes the follow-up characteristic much worse.

The suppressing effect of position control according to the present invention is as follows.

It is assumed that in the control system of FIG. 10, Gc(s) is a transfer function for the integral compensator 52, Gp(s) is a transfer function for the piezoelectric element 58, Gm(s) is a transfer function for the reference model section 60, and Ga(s) is a transfer function for the adaptive mechanism section 66. The respective transfer functions for the integral compensator 52, piezoelectric element 58, reference model section 60, and adaptive mechanism section 66 are expressed as the following equations (5) to (8):

$$Gc(s) = \frac{K_{ci}}{s} \quad (5)$$

$$Ga(s) = K_{ap} + K_{ad}s \quad (6)$$

$$Gp(s) = \frac{A_p\omega_p^2}{s^2 + 2\xi_p\omega_p s + \omega_p^2} \quad (7)$$

$$Gm(s) = \frac{A_m\omega_m^2}{s^2 + 2\xi_m\omega_m s + \omega_m^2} \quad (8)$$

where $K_{ci}$ is the integral gain of the integral compensator 52, $K_{ap}$ and $K_{ad}$ are the proportional and differential gains of the adaptive mechanism section 66, $A_p$, $\xi_p$, and $\omega_p$ are parameters of the piezoelectric element 58, and $A_m$, $\xi_m$, and $\omega_m$ are parameters of the reference model section 60.

A proportional differential compensator according to equation (5) is used in the adaptive mechanism section 66. A second-order low-pass filter according to equation (8) is used in the reference model section 60 of the piezoelectric element.

As seen from FIG. 10, the position control system of the present invention is obtained by adding only the reference model section 60 and proportional differential compensator (adaptive mechanism section 66) to a conventional general position control system. If it were not for the reference model section 60 and adaptive mechanism section 66, the position control system of the invention would be essentially the same as the conventional feedback control system as shown in FIG. 3.

The transfer function of the open loop of the control system in the embodiment is expressed as the following equation (9):

$$G(s) = A_p\omega_p^2 K_{ci} KhKs \; [s^2 + (2\xi_m\omega_m + A_m K_{ad}\omega_m^2)s + \quad (9)$$

$$(\omega_m^2 + A_m K_{ap}\omega_m^2)] /$$

$$s(s^2 + 2\xi_m\omega_m s + \omega_m^2)[s^2 + (2\xi_p\omega_p + A_p K_{ad}\omega_p^2)s + (\omega_p^2 + A_p K_{ad}\omega_p^2)] \quad 10$$

Since mechanical constants $\xi_p$ and $\omega_p$ and gains $K_{ap}$ and $K_{ad}$ are used in equation (9) representing the characteristic of the control system, the operation of adaptive follow-up model control can be analyzed using the above equation.

In equation (9), if $K_{ap}=0$ and $K_{ad}=0$, the same equation as equation (3) will be given. Even with a mechanical system with a poor damping characteristic, the damping characteristic of the system can be improved by adding a control system as shown in the embodiment and setting the proportional and differential gains $K_{ap}$ and $K_{ad}$ of the adaptive mechanical section at suitable values.

As described above, when a control system as shown in the embodiment is added, the transfer function of the open loop changes from equation (3) to equation (9). By determining the pole of the transfer function, the damping and response characteristics of the system can be estimated.

Now, as an example, a piezoelectric element having the frequency characteristic as shown in FIG. 4 will be considered. In FIG. 4, it is assumed that a piezoelectric element has a damping coefficient $\xi_p=0.016$, a natural resonant frequency $\omega_p$ of 11938 [rad/s], and parameter $A_p=0.04$. Thus, this piezoelectric element is a very poor damping system. When a control system of the embodiment is applied to the piezoelectric element, the gains $K_{ap}$ and $K_{ad}$ of the adaptive mechanism can be determined by examining a root locus according to equation (13).

Figure 12:
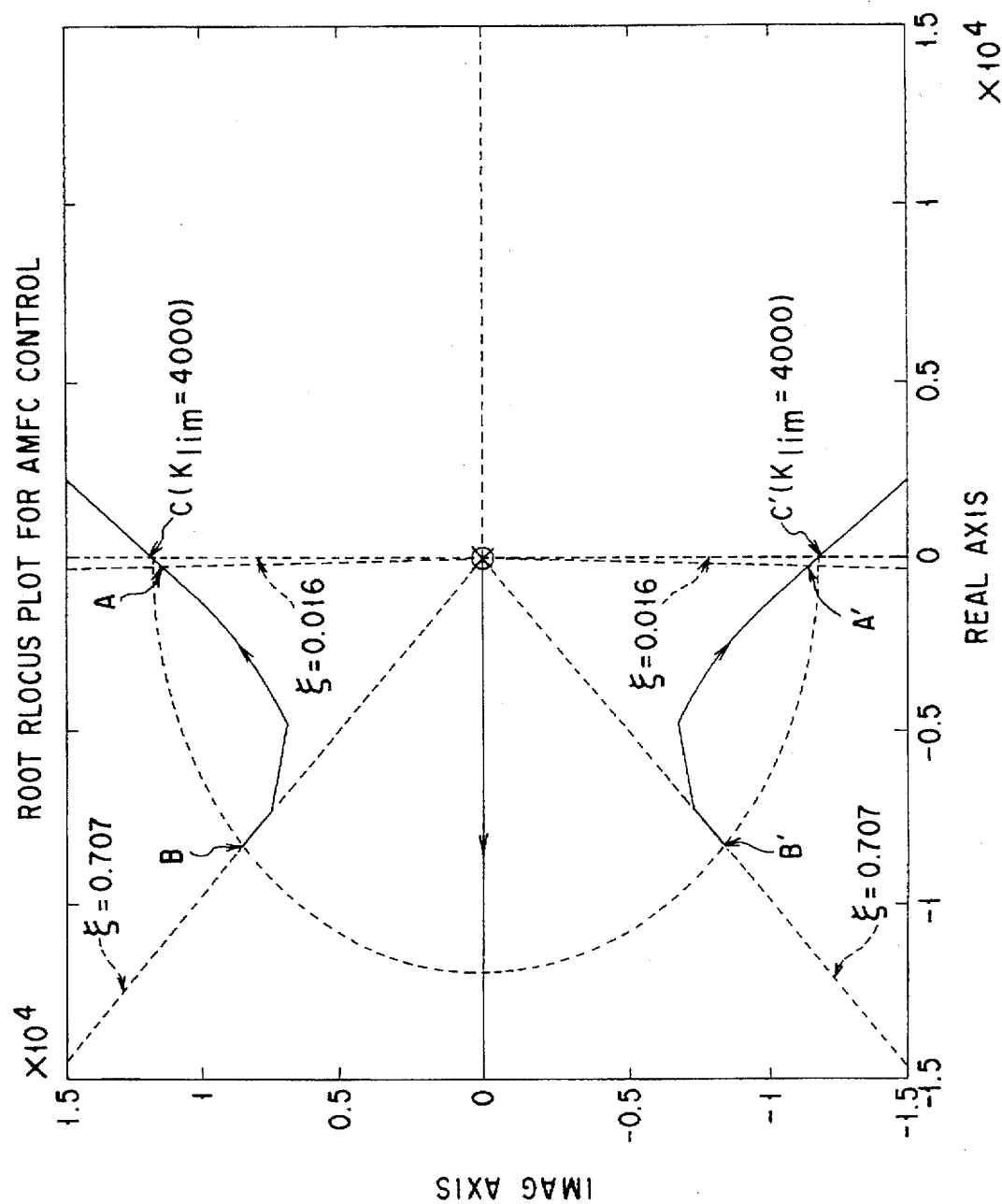
FIG. 12 is a diagram of a root locus of a closed loop drawn with $K_{ap}$=100 and $K_{ad}$=1 as parameters in the present invention.

FIG. 12 shows a root locus of the closed loop drawn using parameters $K_{ap}=100$ and $K_{ap}=1$. From the figure, it is understood that by setting the gains $K_{ap}$ and $K_{ad}$ of the adaptive mechanism section 66 at suitable values, the vibrating point of the piezoelectric element moves from point A to point B and point A' to point B' as shown by the solid lines. As a result, the damping coefficient $\xi$ of the system is improved from 0.016 to 0.707. As shown in FIG. 12, the limit $K_{lim}$ of the integral gain Ki increases from 500 in the conventional system as shown in FIG. 11 to 4000.

Specifically, as compared with the distance from point A (A') to point C (C') on the root locus curve in the allowable range of the differential gain of the conventional control system, the allowable range of the integral gain in the control method of the embodiment is expanded from point B (B') to point C (C') on the root locus curve.

Figure 13:
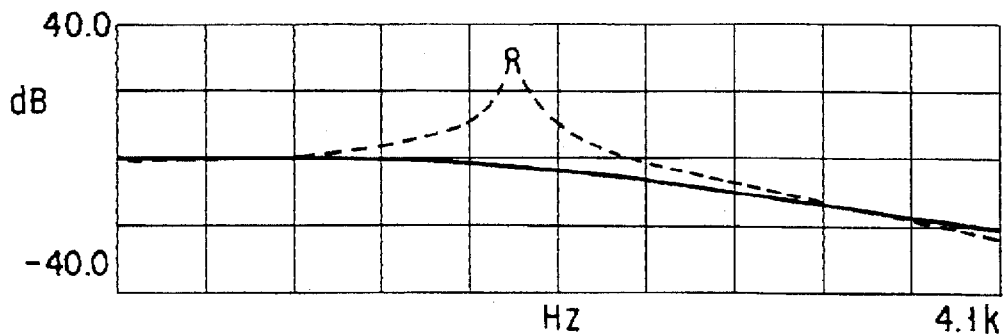
FIG. 13 is a diagram in which the X-direction frequency characteristic (broken lines) of a cylindrical piezoelectric element is compared with the frequency characteristic (solid lines) of the reference model section.

Furthermore, with the configuration, the vibrating pole point of the transfer function Gp(s) of the piezoelectric element 58 is moved to suppress the resonance peak of the cylindrical piezoelectric element as shown by broken lines in FIG. 13 on the basis of the reference model section having a flat characteristic as shown by solid lines in the figure, which thereby enables the control system to respond faster and stabilize better.

Figure 16:
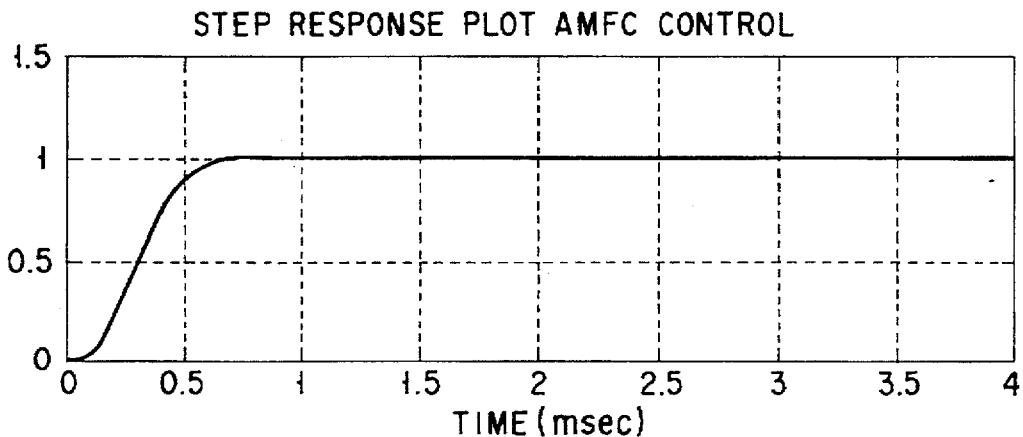
FIG. 16 is a step response characteristic diagram of the control system in the embodiment.

FIG. 16 is a step response diagram for the control system in the embodiment. As compared with the response characteristic diagram for the conventional control system of FIGS. 6A and 6B, the rise-time is obviously shortened remarkably.

For XY triangle wave scanning, equation (5) may be as follows:

$$Gc(s) = K_{ci}\frac{S+1}{S^2} \quad (5')$$

The fact that equation (5') is valid in the invention is apparent to those skilled in the art.

Figure 9A:
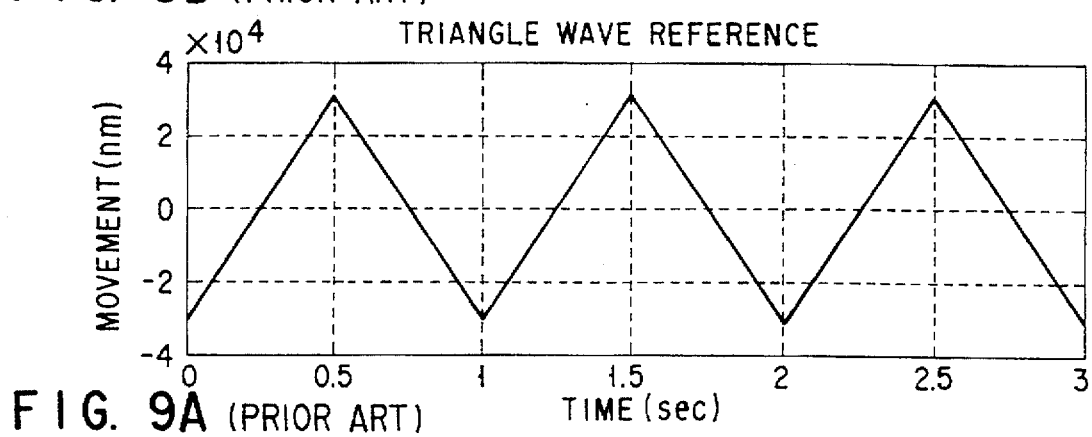
FIGS. 9A and 9B are timing charts for the response characteristic of a 1-Hz triangle scanning signal in the scanning control system of a conventional scanning probe microscope having XY displacement sensors, FIG. 9A being a waveform diagram of the scanning signal, and FIG. 9B being a waveform diagram of the response signal.
Figure 9B:
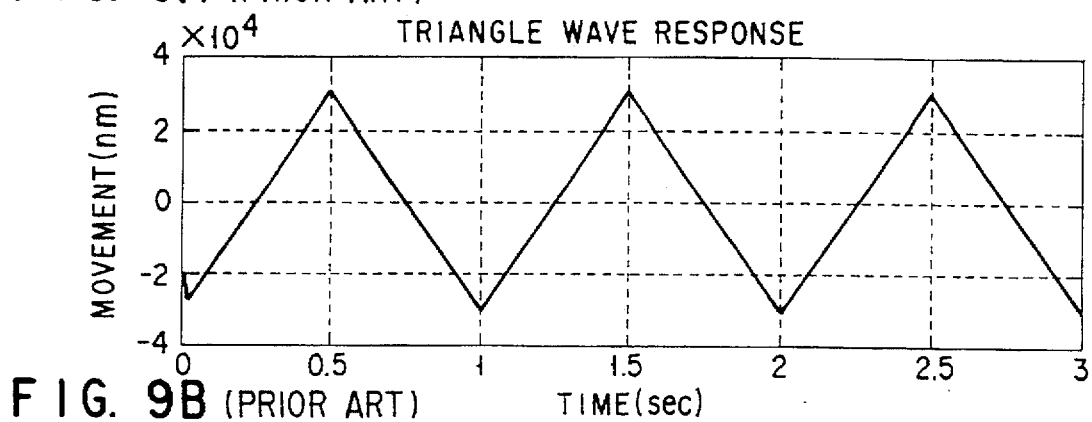
Figure 14A:
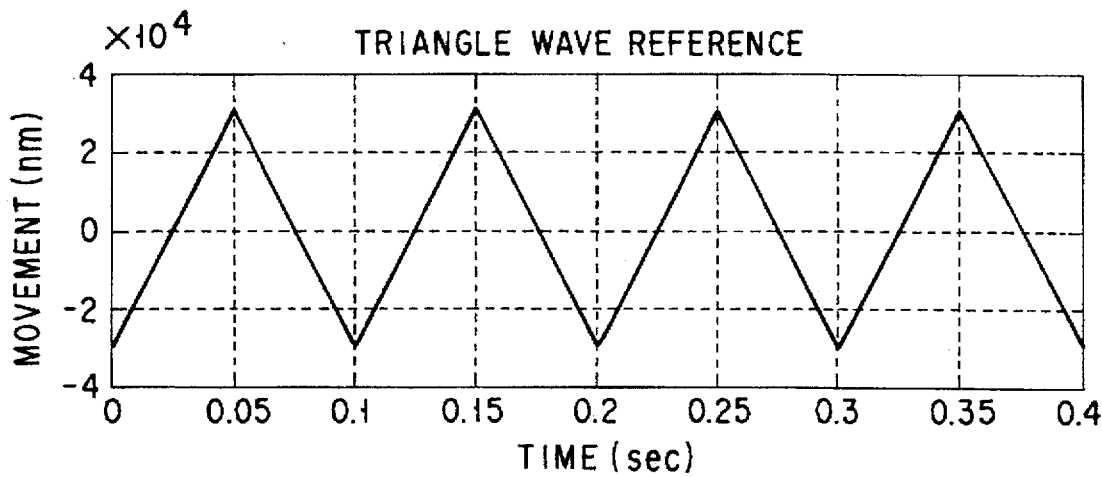
FIGS. 14A and 14B are timing charts for the response characteristic of a 10-Hz triangle scanning signal in the scanning control system in the scanning probe microscope of FIG. 10, FIG. 14A being a waveform diagram of the scanning signal, and FIG. 14B being a waveform diagram of the response signal.
Figure 14B:
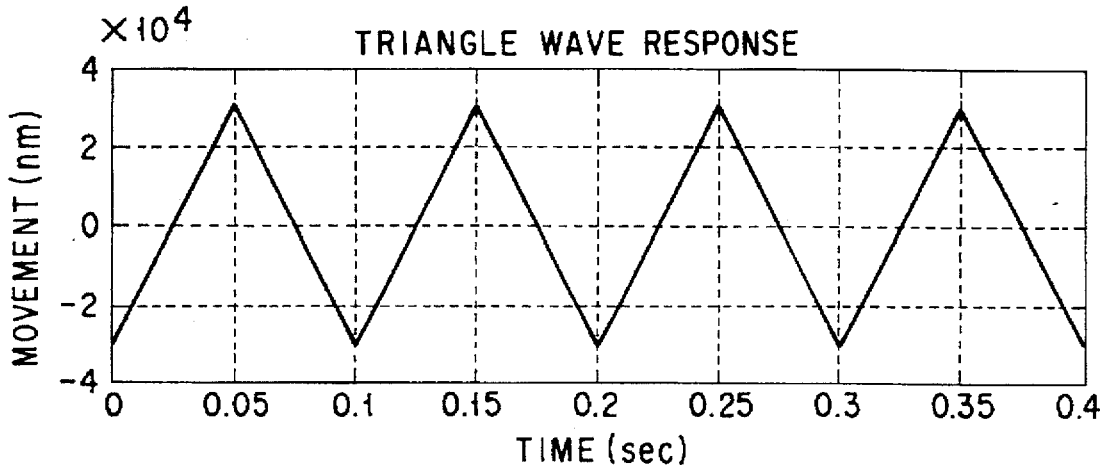

FIGS. 14A and 14B show the response characteristic of a 10-Hz triangle wave scanning signal in the control system in the embodiment. It is understood that the piezoelectric element follows the scanning signal completely, as compared with the response characteristic diagrams of the conventional control system shown in FIGS. 9A and 9B.

Figure 15A:
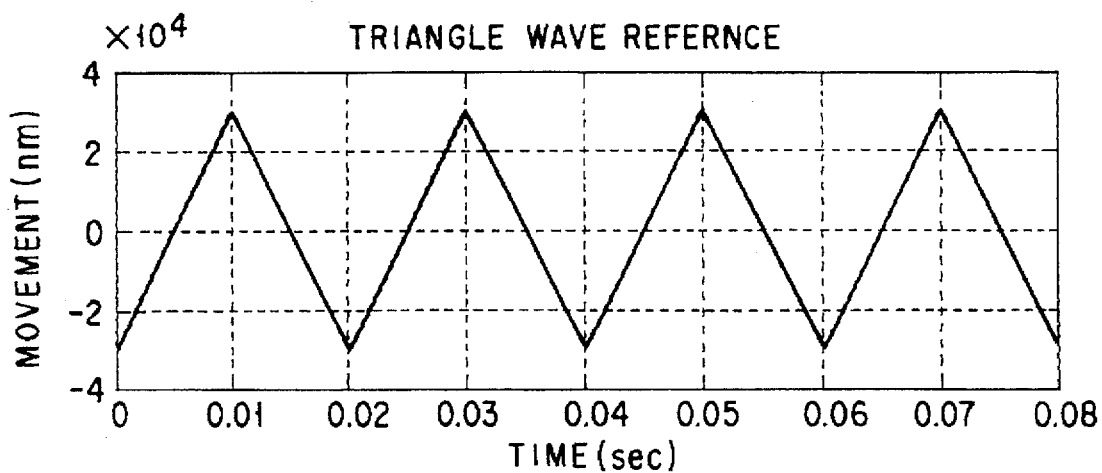
FIGS. 15A and 15B are timing charts for the response characteristic of a 50-Hz triangle scanning signal in the scanning control system in the scanning probe microscope of FIG. 10, FIG. 15A being a waveform diagram of the scanning signal, and FIG. 15B being a waveform diagram of the response signal.
Figure 15B:
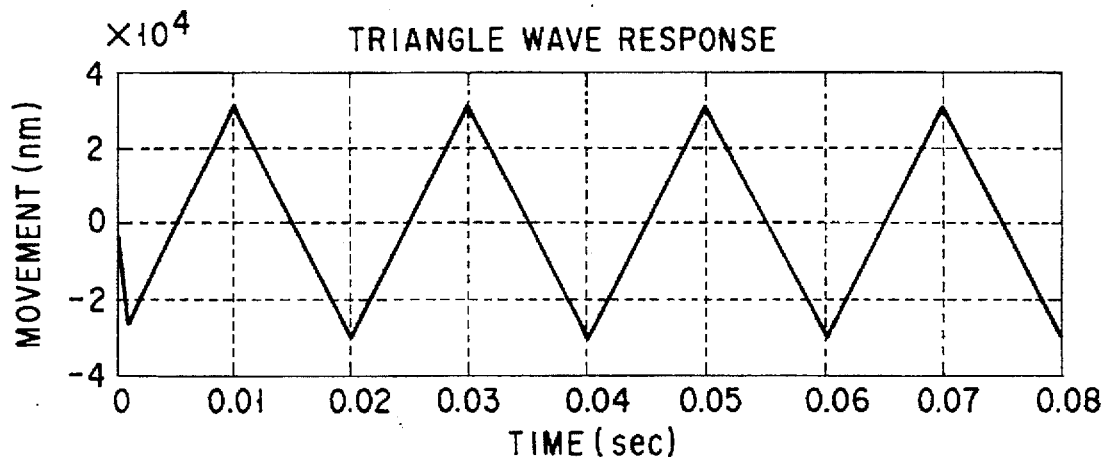

FIGS. 15A and 15B show the response characteristic of a 50-Hz triangle wave scanning signal in the control system in the embodiment. As seen from the figure, the piezoelectric element provides a good follow-up characteristic by scanning even with a 50-Hz triangle wave. This means that high-speed scanning is possible.

Because the position control system in the conventional scanning probe microscope without a control system of the invention has a very low damping coefficient of $\Xi_p=0.016$, the increase of the control gain can cause the control system to vibrate. The faster the response of the position control system (the larger the gain $K_{ci}$), the larger the amplitude of the vibration, which has an adverse effect on measurement, so that high-speed scanning is impossible. The application of the above-described control system improves the damping coefficient remarkably and makes the control gain larger, with the result that the vibration can be suppressed.

As described above, when the damping coefficient $\xi_p$ and natural resonant frequency $\omega_p$ of the piezoelectric element are known, the gains $K_{ap}$ and $K_{ad}$ of the reference model section and adaptive mechanism section can be set suitably, thereby producing a great effect in suppressing resonant vibration.

With the position control system in a scanning probe microscope according to the invention, the reference model section is composed of an ordinary low-pass filter (e.g., a second-order low-pass filter) and the adaptive mechanism section can be constructed very simply so as to perform proportional and differential control. In addition, the position control system uses no special sensor. Therefore, just by adding small software, the invention can be applied to a conventional position control system that performs integral control by a simple feedback using a microcomputer.

As described above, the application of the aforementioned control system to the XY scanning position control system in the scanning probe microscope produces the following effects:

(i) Suppressing resonant vibration of the piezoelectric element, thereby enabling the control system to operate faster and stabilize better (ii) Solving the problem that a scanning probe microscope cannot speed up the scanning speed in a two-dimensional direction as a result of the degradation of the follow-up characteristic at the turning point of the scanning line in conventional feedback control.

The aforementioned control system of the invention is used for XY scanning control of a scanning probe microscope and may, of course, be used for Z-direction servo control. Hereinafter, as a second embodiment of the present invention, a Z displacement servo control system will be explained.

Figure 17:
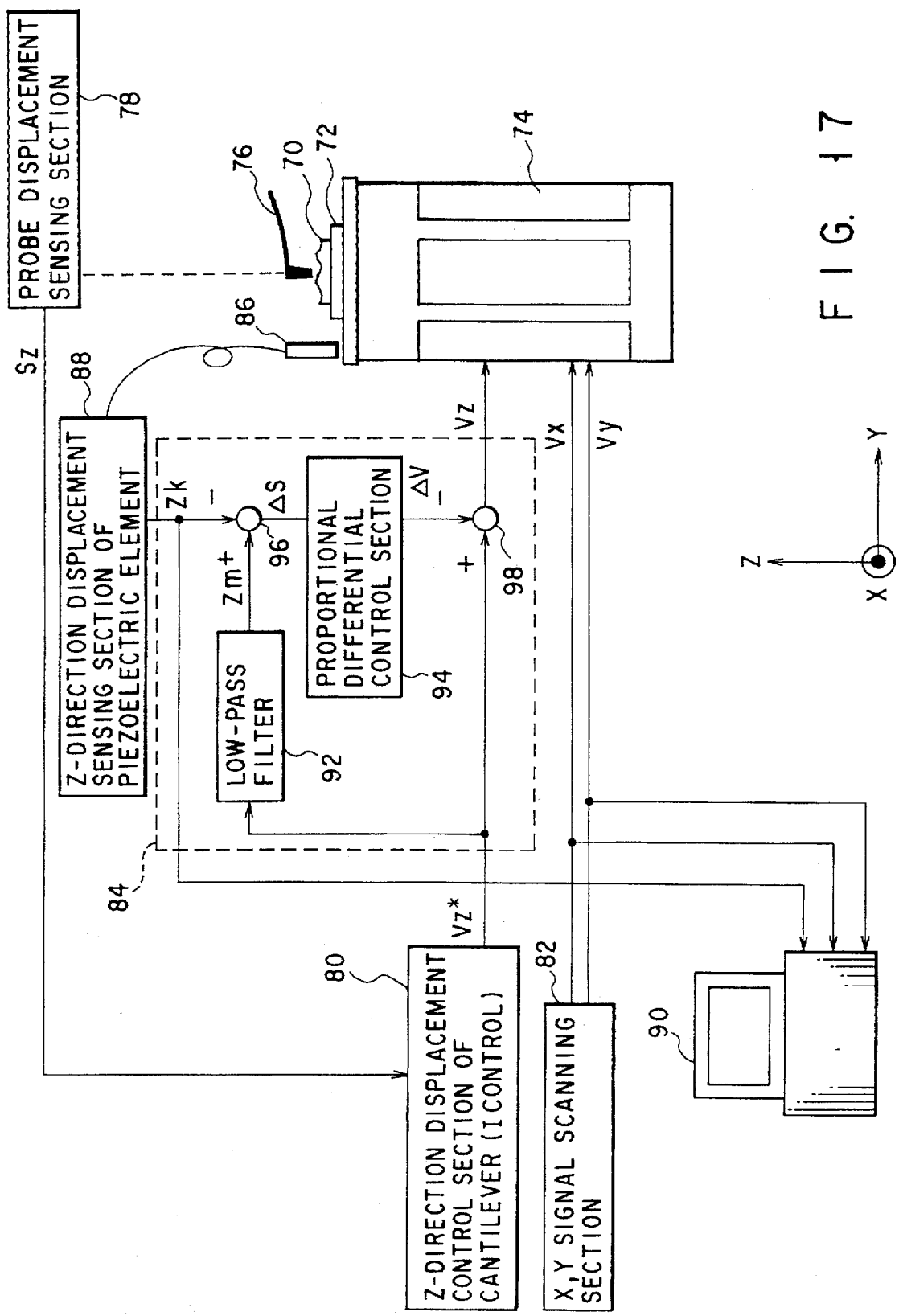
FIG. 17 is a block diagram of the Z displacement servo control system in a scanning probe microscope according to a second embodiment of the present invention.

FIG. 17 is a block diagram of the Z displacement servo control system in a scanning probe microscope according to a second embodiment of the present invention.

In FIG. 17, the scanning probe microscope comprises a specimen carrier 72 that supports a specimen 70 to be measured, a cylindrical piezoelectric element 74 that supports and moves the specimen carrier 72, a cantilever 76 having a probe at its free end, a probe displacement sensing section 78, a cantilever Z-direction displacement control section 80, an XY signal scanning section 82, a model follow-up control section 84, a piezoelectric element displacement sensor 86 for sensing the Z-direction displacement of the piezoelectric element, a piezoelectric element Z-direction displacement sensing section 88, and an SPM (image) display unit 90.

The probe displacement sensing section 78 optically and electrically senses the displacement of the probe of the cantilever 76 caused by the interaction between the probe of the cantilever 76 and the specimen 70 and outputs a displacement signal Sz to the Z-direction displacement control section 80. The Z-direction displacement control section 80 performs feedback control so as to keep constant the distance between the surface of the specimen 70 and the probe's tip of the cantilever 76, and has a displacement sensing function and an integral function.

Specifically, the probe displacement sensing section 78 supplies the displacement Sz of the probe to the Z-direction displacement control section 80, which compares the displacement Sz with the previously set reference value, causes an integrator (not shown) to integrate the resulting deviation ΔZ, generates the applying voltage Vz*, and outputs the voltage to the model follow-up control section 84.

$$Vz^* = K_{ci} \int \Delta Z \, dt \qquad (10)$$

where $K_{ci}$ is the integral gain of the integral compensation.

On the other hand, in the piezoelectric element Z-direction displacement sensing section 88, the Z-direction piezoelectric element displacement sensor 86 placed on the specimen carrier 72 senses the actual displacement Zk of the piezoelectric element 74. The sensed displacement signal Zk is inputted to the model follow-up control section 84 and image display unit 90.

The XY scanning signals Vx and Vy outputted from the XY signal scanning section 82 are applied to the piezoelectric element 74, which is scanned in two-dimensional directions. The XY scanning signals Vx and Vy at this time, together with the displacement signal Zk from the piezoelectric element Z-direction displacement sensing section 88, is transferred to the image display unit 90.

The model follow-up control section 84 comprises a low-pass filter 92, a proportional differential control section 94, and comparators 96 and 98. The order of the low-pass filter is the same as that of the first-order resonance peak in the Z direction of the piezoelectric element 74. The low-pass filter 92 may be composed of an analog filter or a digital filter.

The piezoelectric element displacement sensor 86 may be composed of, for example, an optical sensor or an electrostatic sensor, which is capable of directly sensing the displacement in the Z direction of the piezoelectric element 74.

The individual parts of the scanning probe microscope shown in FIG. 17 correspond to the individual parts of the scanning probe microscope of FIG. 10. Specifically, the integral compensator 52, adder 54, comparator 62, displacement sensor 64, reference model section 60, and adaptive mechanism section 66 in FIG. 10 correspond to the cantilever Z-direction displacement control section 80, comparator 98, comparator 96, probe displacement sensing section 78, piezoelectric element Z-direction displacement sensing section 88, low-pass filter 92, and proportional differential control section 94. This configuration provides the response characteristic shown in FIG. 16.

With such a configuration, receiving the voltage instruction Vz* from the cantilever Z-direction displacement control section 80, the model follow-up control section 84 passes the voltage instruction through the low-pass filter 92, which generates a displacement Zm as a reference model of the piezoelectric element 74. The displacement Zm is a displacement that is not affected by vibration or disturbance. Then, the comparator 96 compares the output Zm of the reference model with the actual displacement Zk of the piezoelectric element 74 and outputs a deviation ΔS (=Zm−Zk). The deviation ΔS is input to the proportion differential control section 84. The section 84 calculates ΔV and Vz as indicated by the following equations (11) and (12):

$$\Delta V = K_{ap}(Z_m - Z_k) + K_{ad} \frac{d(Z_m - Z_k)}{dt} \qquad (11)$$

$$Vz = Vz^* - \Delta V \qquad (12)$$

where $K_{ap}$ and $K_{ad}$ are the proportional and differential gains in the proportional differential control section.

The deviation is corrected at the proportional differential control section 94, which generates a corrected voltage ΔV. The corrected voltage ΔV is added to the applying voltage Vz* at the comparator 98. This enables control to be performed so that the displacement Zk of the piezoelectric element 74 may follow the reference model output Zm.

In the vicinity of the resonating point, the applying voltage to the piezoelectric element 74 is particularly reduced, thereby suppressing the effect of the mechanical resonance peak of the piezoelectric element 74. If the response of the piezoelectric element 74 completely coincides with the output of the reference model, the corrected voltage ΔV=0 will be given, with the result that control system will be equivalent to the conventional control system.

Figure 7A:
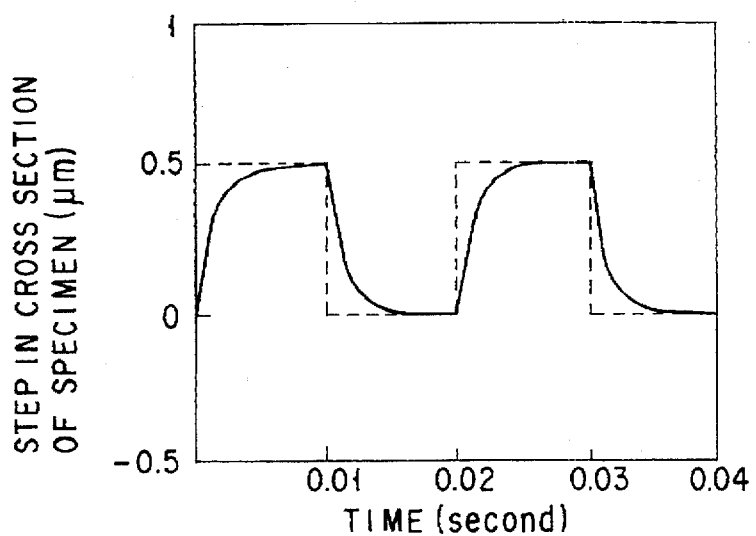
FIGS. 7A to 7C are diagrams to help explain the follow-up characteristic for the unevenness of a specimen's surface of the Z-direction displacement servo control system in the conventional scanning probe microscope.
Figure 7B:
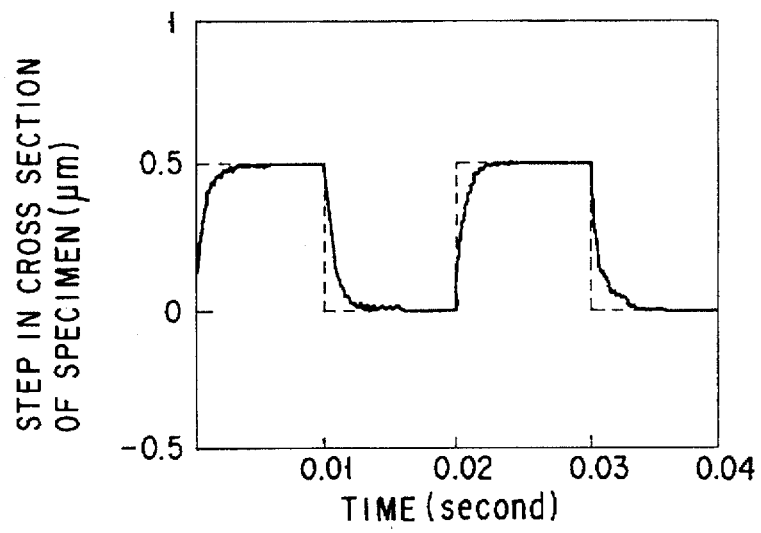
Figure 7C:
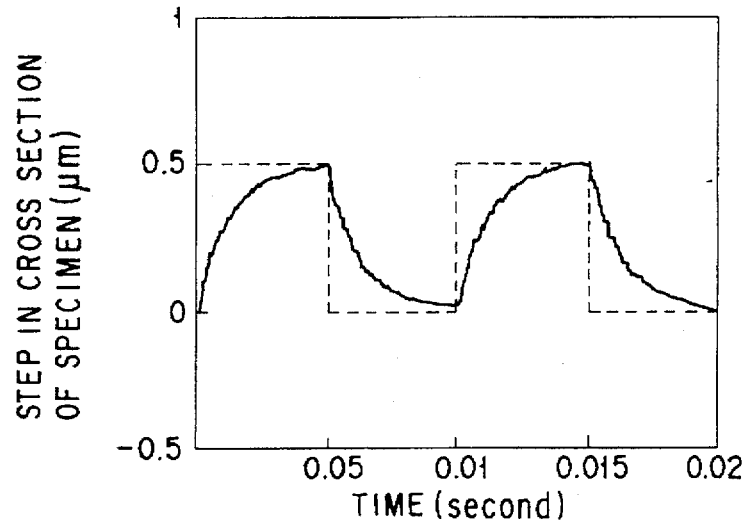
Figure 8A:
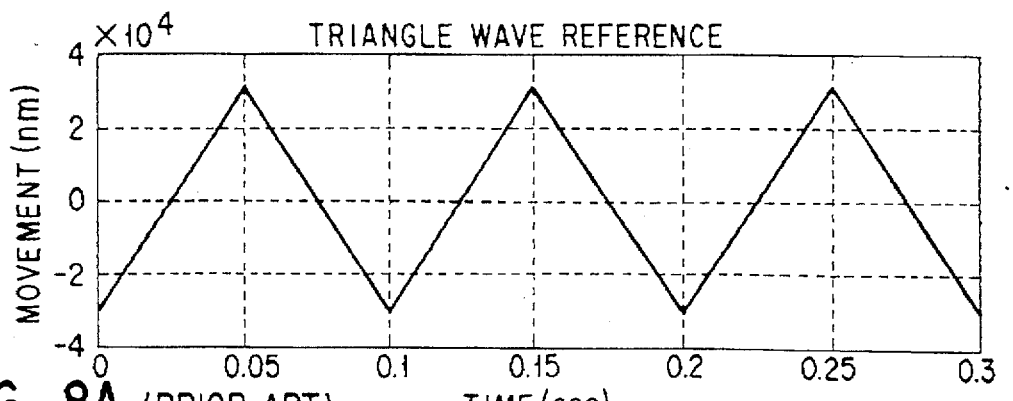
FIGS. 8A and 8B are timing charts for the response characteristic of a 10-Hz triangle scanning signal in the scanning control system of a conventional scanning probe microscope having XY displacement sensors, FIG. 8A being a waveform diagram of the scanning signal, and FIG. 8B being a waveform diagram of the response signal.
Figure 8B:
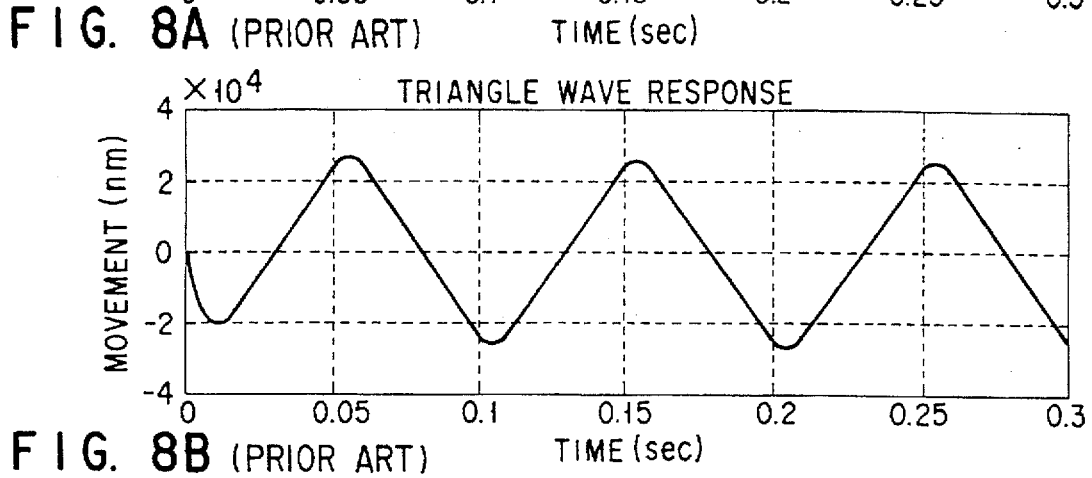
Figure 18A:
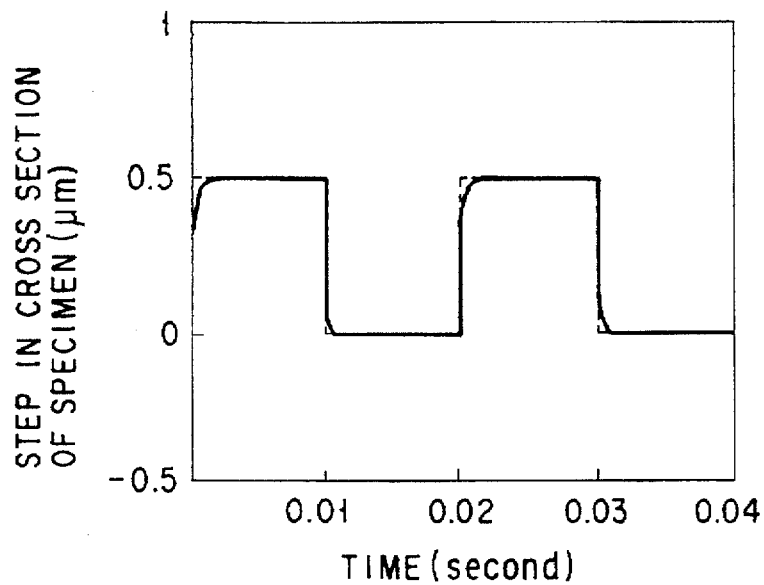
FIGS. 18A and 18B are diagrams for the follow-up characteristic for the unevenness of the specimen's surface of the Z-direction displacement servo control system in the scanning probe microscope of the second embodiment.
Figure 18B:
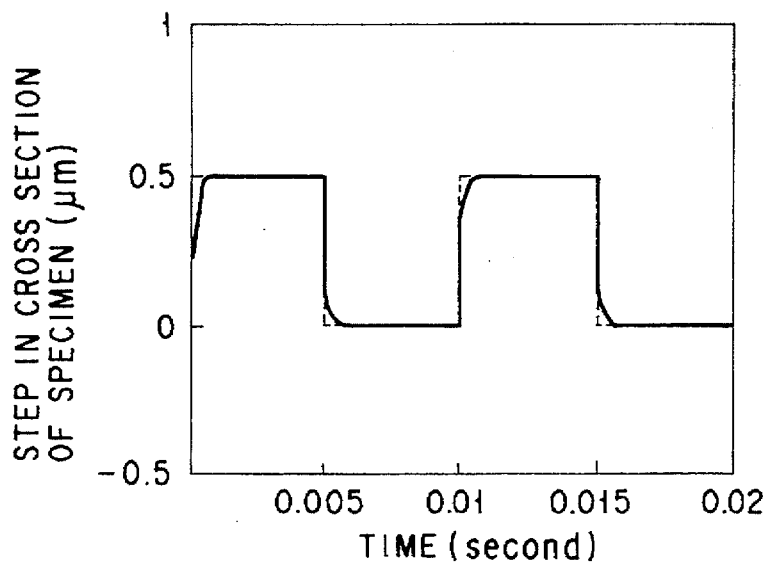

FIGS. 18A and 18B show the follow-up characteristic for the unevenness of a specimen's surface of the Z-direction displacement servo control system in the scanning probe microscope according to the second embodiment. For comparison with the conventional control system, the control conditions, that is, the bumps in the specimen and the scanning speed, are set equal to those in FIGS. 7A and 7C. In FIGS. 18A and 18B, the cross section of the actual specimen is shown by broken lines, and the follow-up characteristic is shown by solid lines.

As described above, with the second embodiment, as shown in FIG. 18A, it is understood that the piezoelectric element almost follows the unevenness of the specimen's surface in the Z direction during scanning at a constant scanning speed in the X direction. As compared with the response characteristic diagram of FIG. 7A in the prior art, the follow-up characteristic of the piezoelectric element for the unevenness of the specimen's surface is obviously improved.

As shown in 18B, even though the scanning speed in the X direction is doubled, the follow-up characteristic of the piezoelectric element is good. As compared with the response characteristic in the prior art of FIG. 7C, the response characteristic shown in FIGS. 18A and 18B has a remarkably short rise-time, with the result that high-speed scanning is possible.

As described above, by sensing the displacement of the piezoelectric element, comparing the displacement with the output of the reference model that does not resonate, and positively controlling the deviation, the voltage applied to the piezoelectric element is adjusted, thereby suppressing the mechanical resonance peak of the piezoelectric element sufficiently. As a result, the control band is expanded, which enables the gain of the control loop to be set high, causing the Z-direction displacement servo control system to respond faster.

Furthermore, it is possible to make the control accuracy in the Z direction higher and sense minute changes in the information on the specimen's surface stably at high speeds without slowing the scanning speed in the XY directions of the piezoelectric element. Even in the case of large and sharp bumps in the specimen's surface, there is no possibility that serious damage will be caused to the probe or the specimen's surface during scanning.

Furthermore, even if the resonating point of the piezoelectric element changes as a result of the change of the specimen carrier or specimen, it is possible to sense minute changes in the information on the specimen's surface stably at high speeds without changing the control gain.

Similar analysis of the Z-direction control system using the root locus can make the control gain larger as confirmed in FIG. 12. Therefore, the control band is expanded, allowing the gain of the control loop to be set higher, so that the response of the Z direction displacement servo control system can be made faster.

Figure 19:
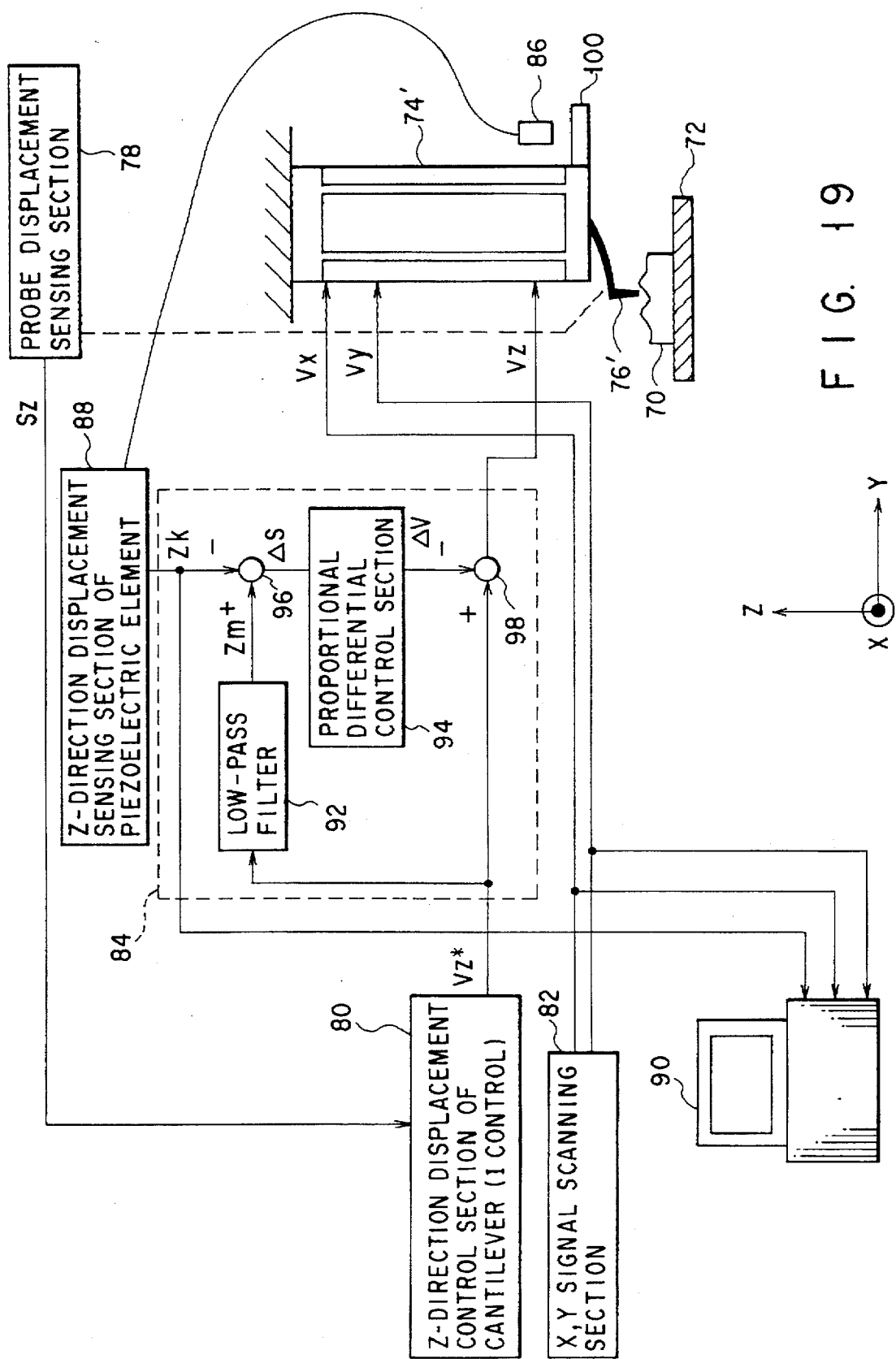
FIG. 19 is a block diagram of the position control system in a reverse scanning probe microscope according to a modification of the second embodiment of the present invention.

While in the second embodiment, the probe scanning microscope has the specimen carrier and specimen placed on the piezoelectric element, the invention is not limited to this. For instance, a cantilever scanning probe microscope as shown in FIG. 19 may be used.

Specifically, a cantilever 76' having a probe and a displacement sensing plate 100 are provided on the bottom end of the piezoelectric element 74'. Below the probe of the cantilever 76', the specimen carrier 72 is located. The specimen 70 is put on the specimen carrier 72. The piezoelectric element displacement sensor 86 provided near and above the plate 100 senses the displacement of the piezoelectric element 74'. The remaining configuration is the same as that of FIG. 17, so explanation of it will not be given.

With such a configuration, because the weight of the specimen carrier and specimen does not change, the resonating point of the piezoelectric element will not change either. Consequently, the control band will not change, making it easier to set the gain of the control loop higher, with the result that the response of the Z-direction displacement servo control system can be made faster.

Hereinafter, a third embodiment of the present invention will be explained.

Figure 20:
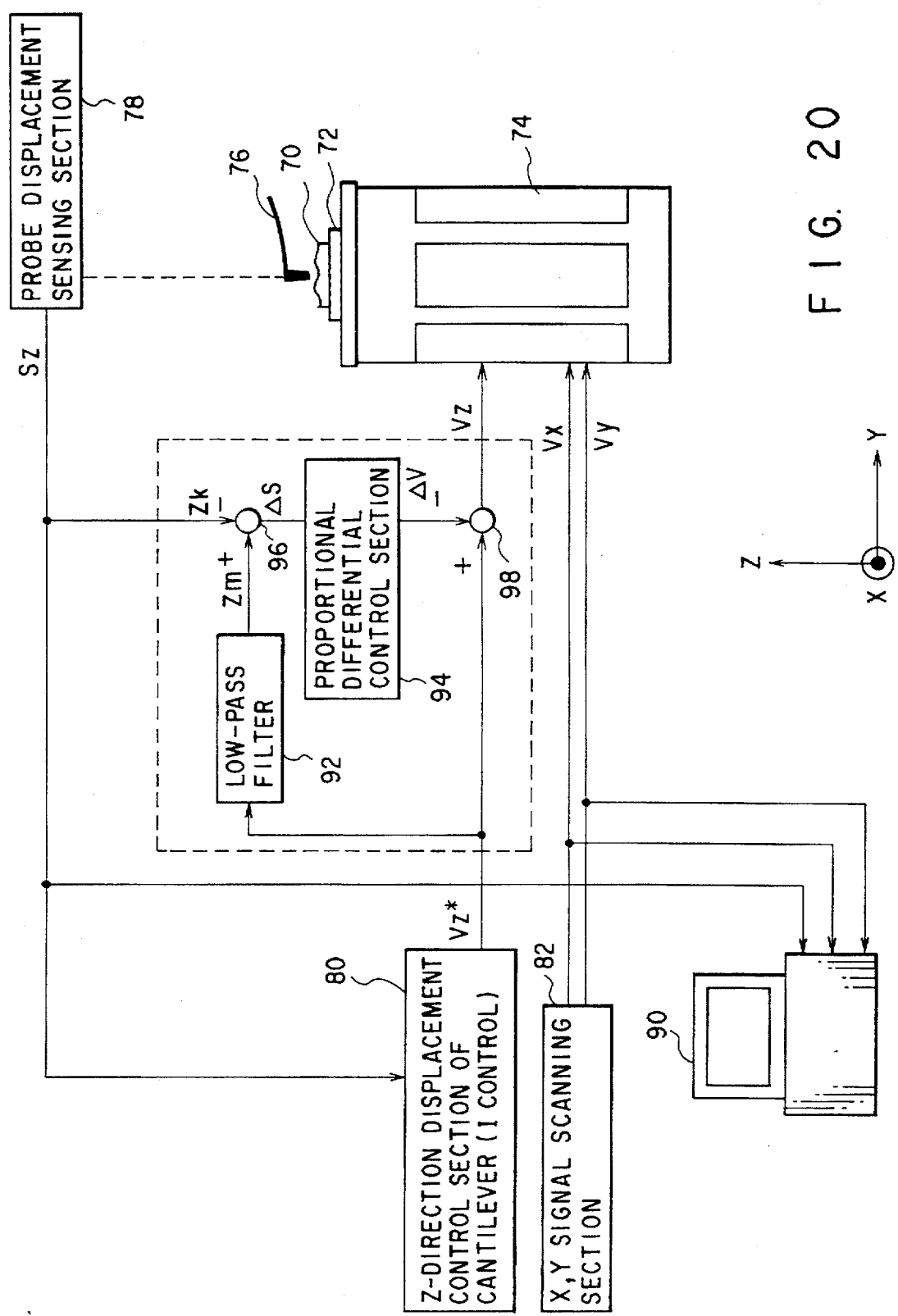
FIG. 20 is a block diagram of the position control system in a scanning probe microscope according to a third embodiment of the present invention.

FIG. 20 is a block diagram of the position control system in a scanning probe microscope according to a third embodiment of the present invention. With the scanning probe microscope, the displacement of the piezoelectric element is sensed indirectly by sensing the displacement of the cantilever.

In FIG. 20, the scanning probe microscope comprises a specimen carrier 72 that supports a specimen 70, a piezoelectric element 74 that supports and moves the specimen carrier 72, a cantilever 76 having a probe at its free end, a probe displacement sensing section 78 that optically senses the displacement of the cantilever 76 due to the interaction between the probe of the cantilever 76 and the specimen 70, a cantilever Z-direction displacement control section 80, an XY signal scanning section 82, a model follow-up control section 84, and an SPM (image) display unit 90.

The probe displacement sensing section 78 senses the displacement of the probe of the cantilever 76 optically and electrically, outputs a displacement signal Sz to the cantilever Z-direction displacement control section 80 and to the image display unit 90 and a comparator 96 in the model follow-up control section 84.

The cantilever Z-direction displacement control section 80 performs feedback so as to keep constant the distance between the surface of the specimen 70 and the tip of the probe of the cantilever 76, and compares the displacement Sz of the probe sensed at the probe displacement sensing section 78 with the previously set reference value Z*. After the comparison, it causes an integrator (not shown) to integrate the deviation $\Delta Z$, generates an applying voltage Vz*, and outputs it to the model follow-up control section 84 (refer to the above equation (10)).

The model follow-up control section 84 comprises a low-pass filter 92, comparators 96 and 98, a proportional differential control section 94.

The cantilever Z-direction displacement control section 80 passes the voltage instruction Vz* through the low-pass filter 92, which generates a displacement Zm as a reference model of the piezoelectric element 74.

Then, the comparator 96 compares the output Zm of the reference model (low-pass filter 92) with the actual displacement Sz of the cantilever sensed at the probe displacement sensing section 78. The deviation is calculated at the proportional differential control section 94 using the above equations (11) and (12). Specifically, the deviation is corrected at the proportional differential control section 94, which generates a corrected voltage $\Delta V$. Then, the corrected voltage $\Delta V$ is added to the applying voltage Vz at the comparator 98.

This enables the piezoelectric element 74 to be controlled so that the reference model output Zm may follow the actual displacement Sz of the cantilever 76. In the vicinity of the resonating point, the applying voltage to the piezoelectric element 74 is reduced, thereby suppressing the mechanical peak of the piezoelectric element 74.

In the third embodiment, the mechanical resonant frequency of the cantilever 76 must be twice as high as the mechanical resonant frequency of the piezoelectric element 74.

As described above, by sensing the displacement of the piezoelectric element through the sensing of the displacement of the cantilever, comparing the displacement of the piezoelectric element with the output of the reference model that does not resonate, and positively controlling the deviation, the voltage applied to the piezoelectric element is adjusted, thereby suppressing the mechanical resonance peak of the piezoelectric element sufficiently. As a result, the control band is expanded, which enables the gain of the control loop to be set high, causing the Z-direction displacement servo control system to respond faster.

Furthermore, it is possible to make the control accuracy in the Z direction higher and sense minute changes in the information on the specimen's surface stably at high speeds without slowing the scanning 10 speed in the XY directions of the piezoelectric element. Even in the case of large and sharp bumps in the specimen's surface, there is no possibility that serious damage will be caused to the probe or the specimen's surface during scanning.

While in the embodiments, the atomic force microscope is used, the present invention may, of course, be applied to a scanning tunneling microscope (STM).

Furthermore, while in the embodiments, the invention is applied to a scanning probe microscope, it may, of course, be applied to the positioning unit in an exposure device in manufacturing semiconductors.

Additionally, the reference model can be constructed very easily. For instance, it may be composed of a simple low-pass filter. Therefore, by just adding a little software or hardware, the present invention can be applied easily to a position scanning control system that performs conventional control, so that it is very practical.

The embodiments described above pertain to X scanning feedback control, Y scanning feedback control and Z-direction displacement servo control, respectively. The present invention, however is not limited to the described embodiments. Rather, X scanning feedback control, Y scanning feedback control and Z-direction displacement servo control may be combined, constituting an XYZ control system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A scanning probe microscope comprising:
   a cantilever having a fixed end portion and a free end portion;
   a probe provided at said free end portion of said cantilever;
   moving means for holding one of said probe and a specimen, and for moving relative positions of said probe and said specimen;
   scanning signal output means for outputting a scanning signal for scanning said moving means;
   moving amount detecting means for detecting a moving amount of said moving means based on said scanning signal, and for outputting a movement signal which corresponds to said detected moving amount;
   a feedback control system including first correction signal generating means for generating a first correction signal for canceling a deviation between said movement signal and said scanning signal; and
   a follow-up control system including: (i) a reference model unit for outputting a theoretical movement signal of said moving means based on said first correction signal; and (ii) a second correction signal generating means for generating a second correction signal for canceling a deviation between said movement signal and said theoretical movement signal, and for outputting said second correction signal to said moving means.

2. The scanning probe microscope according to claim 1, wherein said reference model unit comprises a low-pass filter represented by a preset transmission function, according to which said theoretical movement signal is calculated.

3. The scanning probe microscope according to claim 1, wherein said second correction signal generating means comprises:
   a comparator for calculating a deviation between said movement signal and said theoretical movement signal;
   a proportional differential compensator for outputting said second correction signal based on an output signal from said comparator; and
   an adder for adding said second correction signal to said first correction signal.

4. The scanning probe microscope according to claim 1, wherein said first correction signal output from said first correction signal generating means comprises a signal for moving one of said probe and said specimen on an XY plane which substantially coincides with a surface of said specimen.

5. The scanning probe microscope according to claim 1, wherein:
   said first correction signal output from said first correction signal generating means comprises a signal for moving one of said probe and said specimen on an XY plane which substantially coincides with a surface of said specimen;
   said reference model unit comprises a low-pass filter represented by a preset transmission function, according to which said theoretical movement signal is calculated; and
   said second correction signal generating means comprises:
      a comparator for calculating a deviation between said movement signal and said theoretical movement signal;
      a proportional differential compensator for outputting said second correction signal based on an output signal from said comparator; and
      an adder for adding said second correction signal to said first correction signal.

6. A scanning probe microscope comprising:
   a cantilever having a fixed end portion and a free end portion;
   a probe provided at said free end portion of said cantilever;
   moving means for holding one of said probe and a specimen, and for moving relative positions of said probe and said specimen;
   moving amount detecting means for detecting a moving amount of said moving means, and for outputting a movement signal which corresponds to said detected moving amount;
   a feedback control system including: (i) displacement detection means for detecting a displacement amount of said cantilever based on a change in an interaction between said probe and said specimen, and for outputting a displacement signal which corresponds to said detected displacement amount of said cantilever; and (ii) control signal outputting means for outputting a control signal for controlling a position of said moving means based on said displacement signal output by said displacement detection means; and
   a follow-up control system including: (i) a reference model unit for outputting a theoretical movement signal which corresponds to a theoretical movement amount of said moving means based on said control signal; and (ii) a correction signal generating means for generating a correction signal for canceling a deviation between said movement signal and said theoretical movement signal, and for outputting said correction signal to said moving means.

7. The scanning probe microscope according to claim 6, wherein said reference model unit comprises a low-pass filter represented by a preset transmission function, according to which said theoretical movement signal is calculated.

8. The scanning probe microscope according to claim 6, wherein said correction signal generating means comprises:
   a comparator for calculating a deviation between said movement signal and said theoretical movement signal;
   a proportional differential compensator for outputting said correction signal based on an output signal from said comparator; and an adder for adding said correction signal to said control signal.

9. The scanning probe microscope according to claim 6, wherein said control signal servo-controls said moving means such that a displacement of said cantilever which is caused by said interaction between said probe and said specimen is maintained constant.

10. The scanning probe microscope according to claim 6, further comprising:

an XY directional scanning unit for outputting a signal for scanning said moving means in X and Y directions; and a display unit for displaying a three-dimensional measurement image of said specimen, responsive to an input of said movement signal and said XY scanning signal.

11. The scanning probe microscope according to claim 6, further comprising:

an XY directional scanning unit for outputting a signal for scanning said moving means in X and Y directions; and a display unit for displaying a three-dimensional measurement image of said specimen, responsive to an input of said movement signal and said XY scanning signal;

wherein said control signal servo-controls said moving means such that a displacement of said cantilever which is caused by said interaction between said probe and said specimen is maintained constant;

wherein said reference model unit comprises a low-pass filter represented by a preset transmission function, according to which said theoretical movement signal is calculated; and wherein said correction signal generating means comprises:

a comparator for calculating a deviation between said movement signal and said theoretical movement signal;

a proportional differential compensator for outputting said correction signal based on an output signal from said comparator; and an adder for adding said correction signal to said control signal.

12. A scanning probe microscope comprising:

a cantilever having a fixed end portion and a free end portion;

a probe provided at said free end portion of said cantilever;

moving means for holding one of said probe and a specimen, and for moving relative positions of said probe and said specimen;

displacement detection means for detecting a displacement amount of said cantilever based on a change in an interaction between said probe and said specimen, and for outputting a displacement signal which corresponds to said detected displacement amount, a feedback control system including control signal outputting means for outputting a control signal for controlling a position of said moving means based on said displacement signal output by said displacement detection means; and a follow-up control system including: (i) a reference model unit for outputting a theoretical movement signal which corresponds to a theoretical movement amount of said moving means based on said control signal; and (ii) a correction signal generating means for generating a correction signal for canceling a deviation between said displacement signal and said theoretical movement signal, and for outputting said correction signal to said moving means.

13. The scanning probe microscope according to claim 12, wherein said reference model unit comprises a low-pass filter represented by a preset transmission function, according to which said theoretical movement signal is calculated.

14. The scanning probe microscope according to claim 12, wherein said correction signal generating means includes:

a comparator for calculating a deviation between said displacement signal and said theoretical movement signal;

a proportional differential compensator for outputting said correction signal based on an output signal from said comparator; and an adder for adding said correction signal to said control signal.

15. The scanning probe microscope according to claim 12, wherein said control signal servo-controls said moving means such that a displacement of said cantilever which is caused by said interaction between said probe and said specimen is maintained constant.

16. The scanning probe microscope according to claim 12, further comprising:

an XY directional scanning unit for outputting a signal for scanning said moving means in X and Y directions; and display means for displaying a three-dimensional measurement image of said specimen, responsive to an input of said movement signal and said XY scanning signal.

17. The scanning probe microscope according to claim 12, further comprising:

an XY directional scanning unit for outputting a signal for scanning said moving means in X and Y directions; and a display unit for displaying a three-dimensional measurement image of said specimen, responsive to an input of said movement signal and said XY scanning signal;

wherein said control signal servo-controls said moving means such that a displacement of said cantilever which is caused by said interaction between said probe and said specimen is maintained constant;

wherein said reference model unit comprises a low-pass filter represented by a preset transmission function, according to which said theoretical movement signal is calculated; and wherein said correction signal generating means includes:

a comparator for calculating a deviation between said displacement signal and said theoretical movement signal;

a proportional differential compensator for outputting said correction signal based on an output signal from said comparator; and an adder for adding said correction signal to said control signal.

* * * * *